(12) United States Patent
Ji et al.

(10) Patent No.: US 11,050,538 B2
(45) Date of Patent: Jun. 29, 2021

(54) INFORMATION SENDING AND RECEIVING METHOD AND DEVICE

(71) Applicant: Huawei Technologies Co., Ltd., Shenzhen (CN)

(72) Inventors: Tong Ji, Beijing (CN); Zhe Jin, Beijing (CN); Weiliang Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 16/739,451

(22) Filed: Jan. 10, 2020

(65) Prior Publication Data

US 2020/0153582 A1    May 14, 2020

Related U.S. Application Data

(63) Continuation of application No. PCT/CN2017/092652, filed on Jul. 12, 2017.

(51) Int. Cl.
*H04W 72/04* (2009.01)
*H04L 5/00* (2006.01)

(52) U.S. Cl.
CPC .......... *H04L 5/0048* (2013.01); *H04L 5/0007* (2013.01); *H04W 72/042* (2013.01)

(58) Field of Classification Search
CPC ... H04L 5/0048; H04L 5/0053; H04L 5/0007; H04L 27/2602; H04L 27/2613;
(Continued)

(56) References Cited

U.S. PATENT DOCUMENTS

2014/0301305 A1    10/2014  Xu et al.
2016/0286555 A1    9/2016   Papasakellariou
(Continued)

FOREIGN PATENT DOCUMENTS

CN    106488509 A    1/2017
CN    106921468 A    7/2017
(Continued)

OTHER PUBLICATIONS

"NB-IOT—downlink physical layer concept description," Agenda Item: 6.2.6.2.2, Source: Huawei, HiSilicon, Document for: Discussion and decision, 3GPP TSG RAN WG1 Meeting #83, R1-156462, Nov. 15-22, 2015, 11 pages.

*Primary Examiner* — Eva Y Puente
(74) *Attorney, Agent, or Firm* — Slater Matsil, LLP

(57) ABSTRACT

An information sending and receiving method and a device, the sending method including generating a first signal, and sending the first signal on a first resource. The first resource includes a first part of resource elements (REs), and the first part of the REs comprises at least one of a first RE element or a second RE element. The first RE element comprises all REs corresponding to an orthogonal frequency division multiplexing (OFDM) symbol 0, symbol 1, and symbol 2 in each of subframes 0, 5, and 9 of each radio frame on a first carrier, the second RE element comprises an RE0, RE3, RE6, and RE9 in each of an OFDM symbol 4, 7, 8, and 11 in subframe 0 of each radio frame on the first carrier, and the first carrier is a carrier in a narrow band internet of things (NB-IoT) system.

20 Claims, 8 Drawing Sheets

(58) Field of Classification Search
CPC ....... H04L 5/005; H04L 5/0094; H04L 67/12;
H04L 1/1861; H04L 5/00; H04L 1/08;
H04L 5/001; H04W 72/042; H04W
72/0446; H04W 4/70; H04W 72/0453;
H04W 48/16; H04W 72/04; H04W 4/80;
H04W 76/27; H04W 74/0833; H04W
48/12; H04W 56/001; H04W 52/0216;
H04W 52/0229; H04J 11/00; H04J
11/0079; H04J 1/00; H04J 11/005; H04J
11/0069; H04J 11/0076; H04J 3/0697;
H04J 11/0073; H04J 13/0062
USPC ......................................................... 370/330
See application file for complete search history.

(56) References Cited

U.S. PATENT DOCUMENTS

| | | | |
|---|---|---|---|
| 2017/0187488 | A1 | 6/2017 | Rico Alvarino et al. |
| 2017/0230961 | A1* | 8/2017 | Park ..................... H04L 5/0055 |
| 2018/0020452 | A1* | 1/2018 | Yerramalli ............. H04B 1/713 |
| 2019/0013984 | A1 | 1/2019 | Liang et al. |
| 2020/0396114 | A1* | 12/2020 | Charan Teja Reddy .................... H04L 27/2663 |
| 2021/0068075 | A1* | 3/2021 | Uesaka .................... H04L 1/08 |

FOREIGN PATENT DOCUMENTS

| | | |
|---|---|---|
| CN | 106936756 A | 7/2017 |
| WO | 2017105338 A1 | 6/2017 |
| WO | 2017114470 A1 | 7/2017 |

* cited by examiner

INFORMATION SENDING AND RECEIVING METHOD AND DEVICE

CROSS-REFERENCE TO RELATED APPLICATIONS

This application is a continuation of International Application No. PCT/CN2017/092652, filed on Jul. 12, 2017, the disclosure of which is hereby incorporated by reference in its entirety.

TECHNICAL FIELD

This application relates to the field of communications technologies, and in particular, to an information sending and receiving method and a device.

BACKGROUND

A narrow band Internet of Things (NB-IoT) system is constructed in a cellular network, can occupy a bandwidth of only approximately 180 KHz at least, and can be directly deployed in a Global System for Mobile Communications (GSM) system, a Universal Mobile Telecommunications System (UMTS), or a Long Term Evolution (LTE) system, to reduce deployment costs and to implement a smooth upgrade. The NB-IoT system uses a licensed frequency band, and can coexist with a current network by using three deployment manners, including an in-band mode, a guard-band mode, or a standalone mode.

In the prior art, the foregoing three deployment manners are not differentiated in terms of a resource mapping manner of a synchronization signal, such as a narrow band primary synchronization signal (NPSS) or a narrow band secondary synchronization signal (NSSS), and a master information block-narrow band (MIB-NB), and all perform resource mapping based on the in-band mode, that is, only use last 11 orthogonal frequency division multiplexing (OFDM) symbols of a subframe 5 in a radio frame to send an NPSS, only use last 11 OFDM symbols of a subframe 9 in a radio frame to send an NSSS, and only use last 11 OFDM symbols of a subframe 0 in a radio frame to send an MIB-NB. Moreover, not all resource elements (REs) in the last 11 OFDM symbols of the subframe 0, the subframe 5, and the subframe 9 are used. Some REs therein are not used. To be specific, in the in-band mode, an RE used to carry a cell-specific reference signal (CRS) is not used for transmission of the MIB-NB.

In the in-band mode, the NB-IoT system occupies a frequency band resource of the LTE system. In the LTE system, first three OFDM symbols of each subframe are used to transmit a physical downlink control channel (PDCCH), and some REs are still used to transmit a CRS. Therefore, in the in-band mode, a downlink signal of the NB-IoT system cannot occupy the first three OFDM symbols of the subframe, and cannot occupy the REs that are in the subframe and that are used to carry the CRS. In the guard-band mode or the standalone mode, to keep consistent with the in-band mode, the first three OFDM symbols of the subframe are not used for transmission of the NPSS, the NSSS, and the MIB-NB either. Moreover, an RE at a location of the CRS is not used for MIB-NB transmission. It should be understood that, in the guard-band mode or the standalone mode, the RE at the location of the CRS is actually not used to carry the CRS. Because the location is same with a location of a CRS RE when there is a CRS, the RE herein is referred to as the RE at the location of the CRS.

Therefore, in the guard-band mode and the standalone mode, the first three OFDM symbols of the subframe 5, the subframe 0, and the subframe 9 in the NB-IoT, and the RE at the location of the CRS in the subframe 0 are in an idle state, resulting in resource waste.

SUMMARY

Embodiments of this application provide an information sending and receiving method, and a device, to reduce resource waste and improve resource utilization.

According to a first aspect, an information sending method is provided. The method may be performed by a network device, and the network device, for example, is a base station. The method includes generating, by a network device, a first signal, sending, on a first resource by the network device, the first signal to a terminal device. The first resource includes a first part of REs, the first part of REs includes at least one of all REs corresponding to an OFDM symbol 0, an OFDM symbol 1, and an OFDM symbol 2 in each of a subframe 0, a subframe 5, and a subframe 9 of each radio frame on a first carrier, or an RE0, an RE3, an RE6, and an RE9 in each of an OFDM symbol 4, an OFDM symbol 7, an OFDM symbol 8, and an OFDM symbol 11 in the subframe 0 of each radio frame on the first carrier. The first carrier includes an anchor carrier in an NB-IoT or a non-anchor carrier in the NB-IoT.

Correspondingly, according to a second aspect, an information receiving method is provided. The method may be performed by a terminal device. The method includes receiving, by a terminal device by using a first resource, a first signal, and parsing, by the terminal device, the first signal, to obtain the information carried by the first signal. The first resource includes a first part of REs, the first part of REs includes at least one of all REs corresponding to an OFDM symbol 0, an OFDM symbol 1, and an OFDM symbol 2 in each of a subframe 0, a subframe 5, and a subframe 9 of each radio frame on a first carrier, or an RE0, an RE3, an RE6, and an RE9 in each of an OFDM symbol 4, an OFDM symbol 7, an OFDM symbol 8, and an OFDM symbol 11 in the subframe 0 of each radio frame on the first carrier. The first carrier includes an anchor carrier in an NB-IoT or a non-anchor carrier in the NB-IoT.

In the guard-band mode and the standalone mode, the first three OFDM symbols of the subframe 5, the subframe 0, and the subframe 9 in the NB-IoT, and an RE that is at a location of a CRS in the subframe 0 are in an idle state. The RE at the location of the CRS in the subframe 0 may include the RE0, the RE3, the RE6, and the RE9 in each of the OFDM symbol 4, the OFDM symbol 7, the OFDM symbol 8, and the OFDM symbol 11 in the subframe 0. In the embodiments of this application, the first signal is sent by using the first part of REs, so that this part of REs can be appropriately used, resource waste is reduced, and resource utilization is improved, thereby improving performance of performing demodulation on the first signal by the terminal device.

In a possible design, the first signal is used to carry a master information block (MIB), a system information block (SIB), a synchronization signal, or a narrowband reference signal (NRS).

The first signal may carry different information. In the embodiments of this application, a type of the information carried by the first signal is not limited.

In a possible design, the generating, by a network device, a first signal includes performing, by the network device, encoding on first information used to generate the first signal, to obtain encoded information, performing, by the network device, first scrambling on the encoded information, to obtain first scrambled information, performing, by the network device, modulation on the first scrambled information, to obtain modulated information, and performing, by the network device, second scrambling on the modulated information, to obtain the first signal. Correspondingly, the parsing, by the terminal device, the first signal, to obtain the information carried by the first signal includes performing, by the terminal device, first descrambling on the first signal, to obtain modulated information, performing, by the terminal device, demodulation on the modulated information, to obtain first scrambled information, performing, by the terminal device, second descrambling on the first scrambled information, to obtain encoded information, and performing, by the terminal device, decoding on the encoded information, to obtain the information carried by the first signal.

A process of generating, by the network device, the first signal is described. The network device may generate the first signal through the process. Correspondingly, the terminal device may parse the first signal by using a reverse process, to obtain the information carried by the first signal, to complete transmission of the first signal.

In a possible design, the performing, by the network device, encoding on first information used to generate the first signal, to obtain encoded information, includes performing, by the network device, encoding on the first information, to obtain a first information sub-group, obtaining, by the network device, the encoded information based on the first information sub-group and a second information sub-group, where the second information sub-group includes some or all bits that are in the first information sub-group and that are obtained after encoding is performed on the first information. Correspondingly, the performing, by the terminal device, decoding on the encoded information, to obtain the information carried by the first signal, includes performing, by the terminal device, decoding on a first information sub-group included in the encoded information, to obtain a decoded first information sub-group, performing, by the terminal device, decoding on a second information sub-group included in the encoded information, to obtain a decoded second information sub-group, where the second information sub-group includes some or all bits that are extracted from the first information sub-group and that are obtained after encoding is performed on the first information used to generate the first signal, and obtaining, by the terminal device based on the decoded first information sub-group and the decoded second information sub-group, information carried by the first signal.

In the embodiments of this application, the information carried by the first signal may include two parts. Using the first signal carrying the MIB-NB as an example, in the embodiments of this application, the first signal may be used to carry an entire MIB-NB and a part of information in the entire MIB-NB, that is, the information carried by the first signal includes information corresponding to the entire MIB-NB and information corresponding to a part of the MIB-NB. That is, in the embodiments of this application, newly added resources in the subframes enable the first signal to carry more information. In this way, the terminal device can obtain a signal combination gain in a current subframe, which is beneficial to enhancing demodulation performance of the terminal device. In this case, the network device may generate the first signal in different manners, where one of the manners is, after performing encoding on the first information, the network device extracts a part of information from the obtained first information sub-group as the second information sub-group, so that the obtained encoded information includes the first information sub-group and the second information sub-group, and the finally generated first signal includes two parts of information. In this manner, the first signal is relatively simply obtained. Correspondingly, the terminal device also decodes the encoded information in a corresponding reverse manner, to obtain the information carried by the first signal.

In a possible design, the second information sub-group includes a plurality of third information sub-groups, and the first information sub-group includes a plurality of fourth information sub-groups, where each third information sub-group is a subset of one fourth information sub-group.

In a possible design, the fourth information sub-group includes 200 bits that are the $1^{st}$ bit to the $200^{th}$ bit, the $201^{st}$ bit to the $400^{th}$ bit, the $401^{st}$ bit to the $600^{th}$ bit, the $601^{st}$ bit to the $800^{th}$ bit, the $801^{st}$ bit to the $1000^{th}$ bit, the $1001^{st}$ bit to the $1200^{th}$ bit, the $1201^{st}$ bit to the $1400^{th}$ bit, or the $1401^{st}$ bit to the $1600^{th}$ bit in the first information sub-group.

In a manner of grouping the first information sub-group and extracting bits from each fourth information sub-group, the terminal device is enabled to obtain a signal combination gain from each group. In the NB-IoT system, after 1600 bits obtained after encoding is performed on original information of the MIB-NB are sequentially divided into 8 groups of 200 bits, the first group of 200 bits is transmitted in the first 80 ms of every 640 ms, the second group of 200 bits is transmitted in the second 80 ms of every 640 ms, and by analogy, the eighth group of 200 bits is transmitted in the eighth 80 ms of every 640 ms. Therefore, performing bit extraction by using a 200 bits-based grouping method enables an extracted signal to be close to an original signal corresponding thereto on a time domain, that is, in a same subframe. In this way, a receive end may combine the extracted signal with the original signal, to obtain a combination gain.

In a possible design, the performing, by the network device, first scrambling on the encoded information, to obtain first scrambled information includes performing, by the network device, scrambling on the first information sub-group based on a first scramble code, and performing scrambling on the second information sub-group based on a second scramble code, to obtain the first scrambled information.

Scramble code initialization seeds of the first scramble code and the second scramble code may be same or different, but lengths of the first scramble code and the second scramble code are different. That is, the first scramble code and the second scramble code are different scramble codes. The network device performs scrambling on the first information sub-group and the second information sub-group by using the different scramble codes, thereby ensuring compatibility with an earlier version.

In a possible design, the performing, by the network device, modulation on the first scrambled information, to obtain modulated information includes performing, by the network device, modulation on the first scrambled information, to obtain first modulated sub-information, and obtaining, by the network device, the modulated information based on the first modulated sub-information and second modulated sub-information, where the second modulated sub-information includes some or all modulated symbols that are in the first modulated sub-information and that are obtained after modulation is performed on the first scrambled information. Correspondingly, the performing, by the terminal device, demodulation on the modulated information, to obtain first scrambled information includes performing, by the terminal device, demodulation on first modulated sub-information included in the modulated information, to obtain demodulated first modulated sub-information, performing, by the terminal device, demodulation on second modulated sub-information included in the modulated information, to obtain demodulated second modulated sub-information, where the second modulated sub-information includes some or all modulated symbols that are extracted from the first modulated sub-information and that are obtained after modulation is performed on the first scrambled information, and obtaining, by the terminal device, the first scrambled information based on the demodulated first modulated sub-information and the demodulated second modulated sub-information.

In the embodiments of this application, the information carried by the first signal may include two parts. Using the first signal carrying the MIB-NB as an example, in the embodiments of this application, the first signal may be used to carry an entire MIB-NB and a part of information in the entire MIB-NB, that is, the information carried by the first signal includes information corresponding to the entire MIB-NB and information corresponding to a part of the MIB-NB. That is, in the embodiments of this application, newly added resources in the subframes enable the first signal to carry more information. In this way, the terminal device can obtain a signal combination gain in a current subframe, which is beneficial to enhancing demodulation performance of the terminal device. In this case, the network device may generate the first signal in different manners, where one of the manners is, after performing modulation on the first scrambled information, the network device extracts a part of information from the obtained first modulated sub-information as second modulated sub-information, so that the obtained modulated information includes the first modulated sub-information and the second modulated sub-information, and the finally generated first signal includes two parts of information. In this manner, the first signal is relatively simply obtained. Correspondingly, the terminal device also demodulates the encoded information in a corresponding reverse manner, to obtain the information carried by the first signal.

In a possible design, the performing, by the network device, second scrambling on the modulated information, to obtain the first signal includes performing, by the network device, the second scrambling on the first modulated sub-information based on a third scramble code, and performing the second scrambling on the second modulated sub-information based on a fourth scramble code, to obtain the first signal.

Scramble code initialization seeds of the third scramble code and the fourth scramble code may be same or different, but lengths of the third scramble code and the fourth scramble code are different. That is, the third scramble code and the fourth scramble code are different scramble codes. The network device performs the second scrambling on the first modulated sub-information and the second modulated sub-information by using the different scramble codes, thereby ensuring compatibility with an earlier version.

In addition, in some implementations, the fourth scramble code may be a segment of information in the third scramble code. That is, the fourth scramble code may be viewed as a segment of the third scramble code. After the network device performs modulation on the first scrambled information, there may be another processing manner. That is, the network device performs modulation on the first scrambled information, to directly obtain the modulated information, and the network device performs processing on the modulated information, to obtain the first signal. Specifically, the network device performs the second scrambling on the modulated information, to obtain third scrambled sub-information, and the network device extracts a part of information from the third scrambled sub-information, to obtain fourth scrambled sub-information, so that the fourth scrambled sub-information is a subset of the third scrambled sub-information. The network device may obtain the first signal based on the third scrambled sub-information and the fourth scrambled sub-information. Compared with the solution of making the fourth scramble code be a segment of the third scramble code in the previous example, the network device using such a processing manner can produce a same or similar effect.

According to a third aspect, a network device is provided. The network device has a function of implementing the network device in the foregoing method designs. The function may be implemented by hardware, or may be implemented by hardware executing corresponding software. The hardware or software includes one or more modules corresponding to the foregoing function.

In a possible design, a specific structure of the network device may include a processing module and a sending module. The processing module and the sending module may perform a corresponding function in the method according to the first aspect or any possible design of the first aspect.

According to a fourth aspect, a terminal device is provided. The terminal device has a function of implementing the terminal device in the foregoing method designs. The function may be implemented by hardware, or may be implemented by hardware executing corresponding software. The hardware or software includes one or more modules corresponding to the foregoing function.

In a possible design, a specific structure of the network device may include a processing module and a receiving module. The processing module and the receiving module may perform a corresponding function in the method according to the second aspect or any possible design of the second aspect.

According to a fifth aspect, a communications apparatus is provided. The communications apparatus may be the network device in the foregoing method designs, or a chip disposed in the network device. The communications apparatus includes a memory, configured to store computer-executable program code, a communications interface, and a processor. The processor is coupled to the memory and the communications interface. The program code stored in the memory includes an instruction. When the processor executes the instruction, the communications apparatus is enabled to perform the method performed by the network device according to the first aspect or any possible design of the first aspect.

According to a sixth aspect, a communications apparatus is provided. The communications apparatus may be the terminal device in the foregoing method designs, or a chip disposed in the terminal device. The communications apparatus includes a memory, configured to store computer-executable program code, a communications interface, and a processor. The processor is coupled to the memory and the communications interface. The program code stored in the memory includes an instruction. When the processor executes the instruction, the communications apparatus is enabled to perform the method performed by the terminal device according to the second aspect or any possible design of the second aspect.

According to a seventh aspect, a computer storage medium is provided. The computer-readable storage medium stores an instruction, and when the instruction is run on a computer, the computer is enabled to perform the method according to the first aspect or any possible design of the first aspect.

According to an eighth aspect, a computer storage medium is provided. The computer-readable storage medium stores an instruction, and when the instruction is run on a computer, the computer is enabled to perform the method according to the second aspect or any possible design of the second aspect.

According to a ninth aspect, a computer program product including an instruction is provided. The computer program product stores the instruction, and when the instruction is run on a computer, the computer is enabled to perform the method according to the first aspect or any possible design of the first aspect.

According to a tenth aspect, a computer program product including an instruction is provided. The computer program product stores the instruction, and when the instruction is run on a computer, the computer is enabled to perform the method according to the second aspect or any possible design of the second aspect.

In the embodiments of this application, the first signal is sent by using the REs that are originally not used, so that this part of the REs can be appropriately used, resource waste is reduced, and resource utilization is improved, thereby improving performance of performing demodulation on the first signal by the terminal device.

DETAILED DESCRIPTION OF ILLUSTRATIVE EMBODIMENTS

Figure 1:
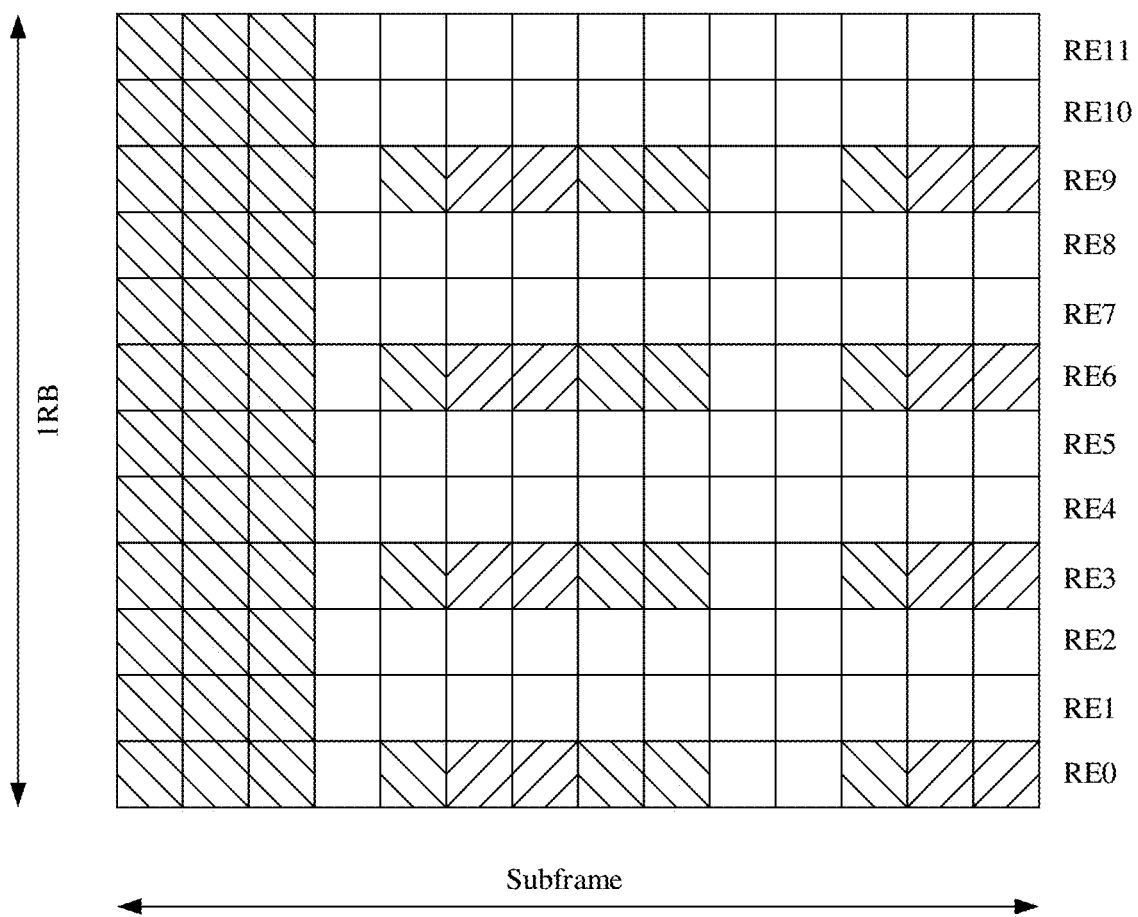
FIG. 1 is a schematic diagram of a resource block (RB) in an NB-IoT system.

To make objectives, technical solutions, and advantages of embodiments of this application clearer, the following clearly and completely describes the technical solutions in the embodiments of this application with reference to the accompanying drawings in the embodiments of this application.

Some terms in the embodiments of this application are explained below, to help persons skilled in the art have a better understanding.

(1) A terminal device may be a device that provides a user with voice and/or data connectivity, for example, may be a handheld device with a wireless connection function, or a processing device connected to a wireless modem. The terminal device may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer having a mobile terminal device, or a portable, a pocket-sized, a handheld, a computer-built-in, or an in-vehicle mobile apparatus, a smart wearable device, and the like. For example, it may be a device such as a personal communication service (PCS) phone, a cordless telephone set, a session initiation protocol (SIP) phone, a wireless local loop (WLL) station, or a personal digital assistant (PDA), a smartwatch, a smart helmet, smart glasses, or a smart band. The terminal device also includes a limited device, such as a device with relatively low power consumption, a device with limited storage capabilities, or a device with limited computing capabilities. For example, it may include an information sensing device such as a bar code, a radio frequency identification (RFID), a sensor, a global positioning system (GPS), or a laser scanner.

(2) A network device, including, for example, a base station (such as an access point), may be a device that is on an access network and that communicates with a wireless terminal device on an air interface through one or more cells. The base station may be configured to mutually convert a received over-the-air frame and an internet protocol (IP) packet, and serve as a router between a terminal device and a rest portion of an access network, where the rest portion of the access network may include an IP network. The base station may further coordinate attribute management of the air interface. For example, the base station may include an evolved NodeB (NodeB, evolutional NodeB, eNB, e-NodeB) in an LTE system or an evolved LTE system (LTE-Advanced, LTE-A), or may include a next generation node B (gNB) in a fifth-generation mobile communications technology (5G) new radio (NR) system.

(3) The terms "system" and "network" may be used interchangeably in the embodiments of this application. The "plurality of" refers to two or more. In view of this, in the embodiments of this application, the "plurality of" may also be understood as "at least two". The term "and/or" describes only an association relationship for describing associated objects and represents that three relationships may exist. For example, A and/or B may represent the following three cases: only A exists, both A and B exist, and only B exists. In addition, if there is no special description, the character "/" generally indicates an "or" relationship between the associated objects.

In addition, unless otherwise stated, ordinal numbers, such as "first" and "second", mentioned in the embodiments of this application are used for distinguishing a plurality of objects without limiting a sequence, a time sequence, priorities, or importance levels of the plurality of objects.

The foregoing describes some concepts included in the embodiments of this application, and the technical background of the embodiments of this application is described below.

A subframe 0 is used as an example. In an anchor carrier of the NB-IoT, the subframe 0 in each radio frame is used to transmit an MIB-NB of the NB-IoT, and the MIB-NB may be transmitted by using a narrow physical broadcast channel (NPBCH). In the subframe 0, a resource element (RE) actually used by the NPBCH includes only a blank location as shown in FIG. 1. Each block in FIG. 1 represents one RE. REs that are not used by the NPBCH include two parts, where one part is reserved for the LTE system to transmit a PDCCH and a CRS, namely, REs drawn with backslashes "\" in FIG. 1, and another part is reserved for the NB-IoT system to transmit a narrowband reference signal (NRS), namely, REs drawn with slashes "/" in FIG. 1. The part reserved for the NRS is necessary because a reference signal is needed for performing channel estimation. However, in two deployment modes, namely, a guard-band mode and a standalone mode, of the NB-IoT system, the part reserved for the LTE system to transmit the PDCCH and the CRS is idle because a frequency band resource of the LTE system is not used. Therefore, the part is actually unnecessary, resulting in resource waste.

In view of this, the embodiments of this application provide a new information sending and receiving method, so that resource waste can be reduced by using the method.

Figure 2:
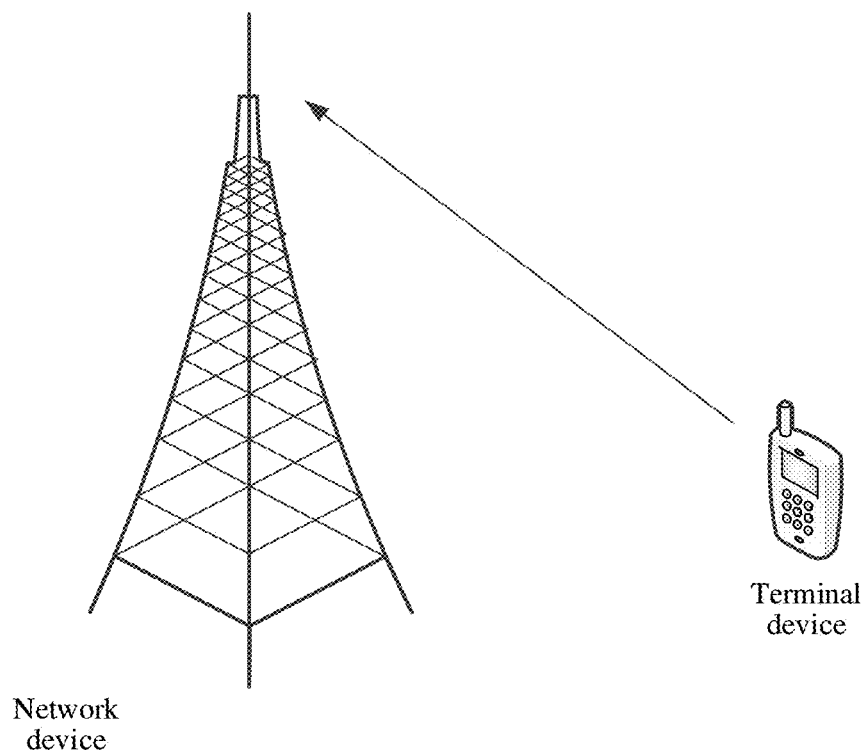
FIG. 2 is a schematic diagram of an application scenario according to an embodiment of this application.

FIG. 2 describes an application scenario according to an embodiment of this application. FIG. 2 includes a network device and a terminal device. By using the method provided in the embodiments of this application, the network device may send a first signal to the terminal device by using a first resource. A quantity of the terminal devices in FIG. 2 is only an example. In an actual application, the network device may provide a service to a plurality of terminal devices, and the network device may send the first signal to the plurality of terminal devices. The network device in FIG. 2 is, for example, a base station.

The embodiments of this application may be applied to the LTE system, and may also be applied to another wireless communications system such as a Global System for Mobile Communications (GSM), a mobile telecommunications system (UMTS), a Code Division Multiple Access (CDMA) system, or a next-generation communications system. In a description process of this application, a guard-band mode or a standalone mode of the NB-IoT system applied to the LTE system is used as an example.

The technical solutions provided in the embodiments of this application are described below in detail with reference to the accompanying drawings. In the following description process, an application scenario shown in FIG. 2 to which the technical solutions according the embodiments of this application are applied is used as an example. Certainly, it is not limited in an actual application.

Figure 3:
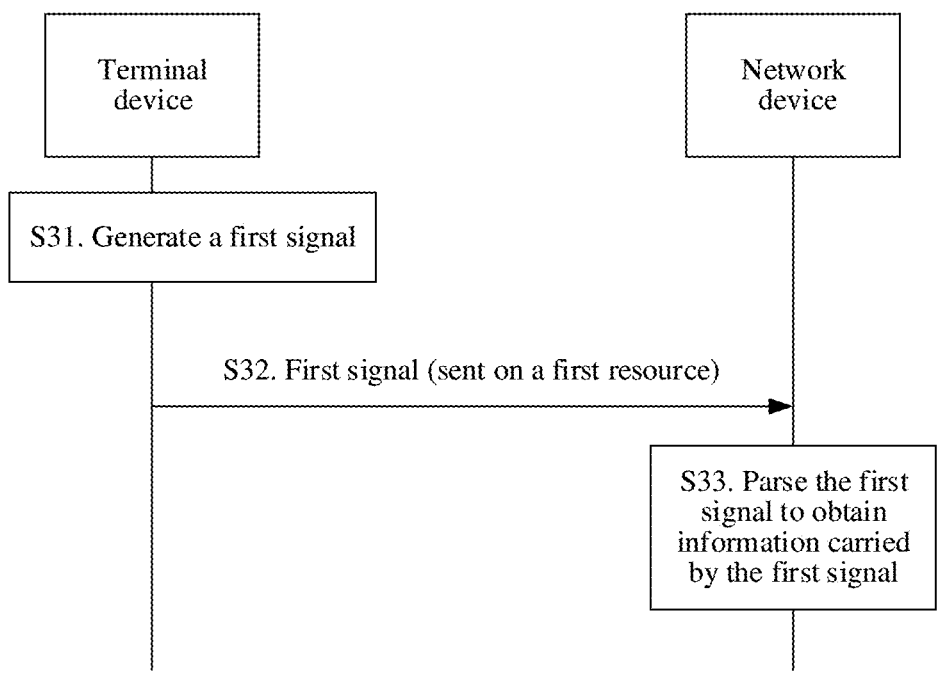
FIG. 3 is a flowchart of an information sending and receiving method according to an embodiment of this application.

Referring to FIG. 3, an embodiment of this application provides an information sending and receiving method. A procedure of the method is described as follows.

S31: A network device generates a first signal.

S32: The network device sends the first signal to a terminal device on a first resource, and the terminal device receives the first signal through the first resource.

S33: The terminal device parses the received first signal, to obtain information carried by the first signal.

Based on the foregoing analysis, it can be learned that in an in-band mode of the NB-IoT system, a resource is reserved for the LTE system to transmit the PDCCH and the CRS. To keep consistency, a deployment manner same as that in the in-band mode is also used in a guard-band mode and a standalone mode. That is, a corresponding resource is also set to be idle. However, in two deployment modes, namely, the guard-band mode and the standalone mode, because a frequency band resource of the LTE system is not used by the NB-IoT system, an idle resource is not used and is actually unnecessary, resulting resource waste. In this case, this embodiment of this application may utilize this part of resources, thereby improving resource utilization. Specifically, the first resource includes a first part of REs, and the first part of REs may include at least one RE of the following: all REs corresponding to an orthogonal frequency division multiplexing (orthogonal frequency division multiplexing, OFDM) symbol 0, an OFDM symbol 1, and an OFDM symbol 2 in each of a subframe 0, a subframe 5, and a subframe 9 of each radio frame on a first carrier, or an RE0, an RE3, an RE6, and an RE9 in each of an OFDM symbol 4, an OFDM symbol 7, an OFDM symbol 8, and an OFDM symbol 11 in the subframe 0 of each radio frame on the first carrier.

In the in-band mode, all the REs corresponding to the OFDM symbol 0, the OFDM symbol 1, and the OFDM symbol 2 in each of the subframe 0, the subframe 5, and the subframe 9 of each radio frame are REs used to transmit the PDCCH and the CRS by the LTE system, and in the in-band mode, the RE0, the RE3, the RE6, and the RE9 in each of the OFDM symbol 4, the OFDM symbol 7, the OFDM symbol 8, and the OFDM symbol 11 in the subframe 0 of each radio frame are REs used to transmit the CRS by the LTE system. The guard-band mode and the standalone mode keep consistent with the in-band mode. Therefore, in the guard-band mode and the standalone mode, these REs are in an idle state. Therefore, in this embodiment of this application, this part of REs is used in the guard-band mode and the standalone mode, and the first signal is transmitted by using this part of REs, to improve resource utilization, thereby improving performance of performing demodulation on the first signal by the terminal device.

In this embodiment of this application, the subframes and the OFDM symbols are sequentially number in chronological order. For example, one radio frame includes 10 subframes, and in chronological order, the 10 subframes are respectively marked as a subframe 0 to a subframe 9, and one subframe includes 14 OFDM symbols, and in chronological order, the 14 OFDM symbols are respectively marked as an OFDM symbol 0 to an OFDM symbol 13, where for the one subframe, the OFDM symbol 0 to the OFDM symbol 6 correspond to an OFDM symbol 0 to an OFDM symbol 6 in a first slot of the subframe, and the OFDM symbol 7 to the OFDM symbol 13 of the subframe correspond to an OFDM symbol 0 to an OFDM symbol 6 in a second slot of the subframe. REs corresponding to one OFDM symbol may be numbered in order from a low frequency to a high frequency. One RB is shown in FIG. 1. In the RB, REs are numbered as an RE0 to an RE11 in order from a low frequency to a high frequency. The numbers of the REs herein may also be understood as numbers of subcarriers. For example, all the REs corresponding to the symbol 0 in the subframe 0 on the first carrier are the RE0 to the RE11 corresponding to the symbol 0 in the subframe 0 on the first carrier. A number of an RE in this embodiment of this application is a relative number in an RB. If an RB is put into an entire bandwidth, a number of an RE is related to a location of the RB in the bandwidth, that is, the number of the RE may change.

The first carrier may include at least one subcarrier, where each subcarrier may be a frequency spectrum resource of 15 kHz, and certainly, may be a frequency spectrum resource of another type. The at least one subcarrier included in the first carrier may be consecutive subcarriers. For example, the first carrier may be a frequency spectrum resource formed by 12 consecutive subcarriers. Alternatively, the at least one subcarrier included in the first carrier may be non-consecutive subcarriers. In an example, the first carrier may be an anchor carrier in the NB-IoT system or a non-anchor carrier in the NB-IoT system. The anchor carrier may be used to carry relatively important information such as a system message or a synchronization signal. The non-anchor carrier may be used to carry information in a communication process. For example, after communication is established, communication may be performed by using the non-anchor carrier.

In this embodiment of this application, the first resource may further include a second part of REs. The second part of REs includes all or some of REs used to carry the NPBCH. Using FIG. 1 as an example, the second part of REs may include at least one RE of the following. REs corresponding to each of the OFDM symbol 3 to the OFDM symbol 13 in each of the subframe 0, the subframe 5, and the subframe 9 of each radio frame on the first carrier. Specifically, REs corresponding to each of the OFDM symbol 3, the OFDM symbol 9, and the OFDM symbol 10 in each of the subframe 0, the subframe 5, and the subframe 9 of each radio frame may be all corresponding REs. For example, all REs corresponding to the symbol 3 in the subframe 0 include RE0 to RE11 corresponding to the symbol 3. REs corresponding to each of the OFDM symbol 4, the OFDM symbol 5, the OFDM symbol 6, the OFDM symbol 7, the OFDM symbol 8, the OFDM symbol 11, the OFDM symbol 12, and the OFDM symbol 13 in each of the subframe 0, the subframe 5, and the subframe 9 of each radio frame may be some of corresponding REs. For example, REs corresponding to each of the OFDM symbol 4, the OFDM symbol 5, the OFDM symbol 6, the OFDM symbol 7, the OFDM symbol 8, the OFDM symbol 11, the OFDM symbol 12, and the OFDM symbol 13 in each of the subframe 0, the subframe 5, and the subframe 9, include RE1, RE2, RE4, RE5, RE7, RE8, RE10, and RE11 that correspond to each OFDM symbol.

In this embodiment of this application, the first signal may be used to carry different information such as the MIB-NB, a system information block (system information block, SIB), a synchronization signal, or the NRS. Certainly, the first signal may further carry other information. This is not limited in this embodiment of this application. If the NRS is carried by the first signal, it is beneficial to improving performance of channel estimation.

In this embodiment of this application, the information carried by the first signal may include two parts. Using the first signal carrying the MIB-NB as an example, in this embodiment of this application, the first signal may be used to carry an entire MIB-NB and a part of information in the entire MIB-NB, that is, the information carried by the first signal includes information corresponding to the entire MIB-NB and information corresponding to a part of the MIB-NB. When the first signal is sent by using the first resource, the first part of REs is used to carry the information corresponding to a part of the MIB-NB, and the second part of REs are used to carry the information corresponding to the entire MIB-NB. That is, in the embodiments of this application, newly added resources in the subframes enable the first signal to carry more information. In this way, the terminal device can obtain a signal combination gain in a current subframe, which is beneficial to enhancing demodulation performance of the terminal device.

In this embodiment of this application, the network device may generate the first signal in the following manner.

The network device performs encoding on first information used to generate the first signal, to obtain encoded information, the network device performs first scrambling on the encoded information, to obtain first scrambled information, the network device performs modulation on the first scrambled information, to obtain modulated information, and then, the network device performs second scrambling on the modulated information, to obtain the first signal. After obtaining the first signal, the network device may send the first signal by using the first resource.

The first information may be information obtained after adding a cyclic redundancy check (CRC) to original information used to generate the first signal, the first scrambling is, for example, bit (bit) level scrambling, and the second scrambling is, for example, symbol level scrambling. That is, the network device generates the original information, and adds the CRC to the original information, to obtain the first information, and the network device performs encoding on the first information, to obtain the encoded information. The network device performs bit level scrambling on the encoded information, where the obtained information is referred to as the first scrambled information. Further, the network device performs modulation on the first scrambled information, to obtain a modulated symbol, namely, the modulated information, and then the network device performs resource mapping and symbol level scrambling on the modulated information, to obtain the first signal that can be sent. If the first signal carries the MIB-NB, the original information may be original information of the MIB-NB. Similarly, if the first signal carries other information, the original information may be original information of the other information.

The following describes several manners of generating the first signal.

In an example, after generating the original information, the network device may extract some information from the original information. To ensure compatibility with an earlier version, the network device may perform processing separately on the original information and the extracted part of the original information. That is, the network device separately adds the CRC to the original information and the part of the original information, and the first information includes the original information to which the CRC is added and the part of the original information to which the CRC is added. In this application, the original information to which the CRC is added is referred to as first sub-information, and the part of the original information to which the CRC is added is referred to as second sub-information. The network device performs processing on the first sub-information and the second sub-information, to obtain the encoded information. Specifically, the network device performs encoding on the first sub-information, to obtain encoded first sub-information, and the network device performs encoding on the second sub-information, to obtain encoded second sub-information. Therefore, the network device obtains the encoded information based on the encoded first sub-information and the encoded second sub-information. It may be understood that the encoded information includes the encoded first sub-information and the encoded second sub-information. The network device performs processing on the encoded first sub-information and the encoded second sub-information, to obtain the first scrambled information. Specifically, the network device performs the first scrambling on the encoded first sub-information, to obtain first scrambled sub-information, and performs the first scrambling on the encoded second sub-information, to obtain second scrambled sub-information. The network device obtains first scrambled information based on the first scrambled sub-information and the second scrambled sub-information. It may be understood that the first scrambled information includes the first scrambled sub-information and the second scrambled sub-information. The network device performs modulation on the first scrambled information, to obtain the modulated information. Specifically, the network device performs modulation on the first scrambled sub-information, to obtain first modulated sub-information, and the network device performs modulation on the second scrambled sub-information, to obtain second modulated sub-information. The network device obtains the modulated information based on the first modulated sub-information and the second modulated sub-information. The network device then performs processing on the modulated information, to obtain the first signal. Specifically, the network device performs resource mapping and the second scrambling on the first modulated sub-information, to obtain a first sub-signal, and the network device performs resource mapping and the second scrambling on the second modulated sub-information, to obtain a second sub-signal. Therefore, the network device obtains the first signal based on the first sub-signal and the second sub-signal. It may be understood that the first signal includes the first sub-signal and the second sub-signal. The first sub-signal is used to carry original information, and the second sub-signal is used to carry a part of the original information extracted from the original information. For example, the original information is original information of the MIB-NB, and the part of original information in this example is a part of information in the original information of the MIB-NB. The network device maps the first modulated sub-information to the second part of REs, and maps the second modulated sub-information to the first part of REs.

In another example, after generating original information, the network device adds a CRC to the original information and obtains the original information in which the CRC is added. The network device extracts a part of information from the original information to which the CRC is added, and the extracted part of information is referred to as a part of information of the original information to which the CRC is added. The network device obtains the first information based on the original information to which the CRC is added and the part of information of the original information to which the CRC is added, and it may be understood that the first information includes the original information to which the CRC is added and the part of information of the original information to which the CRC is added. To ensure compatibility with an earlier version, the network device may perform processing separately on the original information to which the CRC is added and the part of the original information to which the CRC is added, to obtain the encoded information. To be specific, the network device performs encoding on the original information to which the CRC is added, to obtain a first information sub-group, and the network device performs encoding on the part of information of the original information to which the CRC is added, to obtain a second information sub-group. The network device obtains the encoded information based on the first information sub-group and the second information sub-group, and it may be understood that the encoded information includes the first information sub-group and the second information sub-group. The network device performs processing on the first information sub-group and the second information sub-group, to obtain the first scrambled information. Specifically, the network device performs the first scrambling on the first information sub-group, to obtain first scrambled sub-information, and the network device performs the first scrambling on the second information sub-group and obtains second scrambled sub-information. The network device obtains the first scrambled information based on the first scrambled sub-information and the second scrambled sub-information. The network device performs processing on the first scrambled information, to obtain the modulated information. Specifically, the network device performs modulation on the first scrambled sub-information, to obtain first modulated sub-information, and the network device performs modulation on the second scrambled sub-information, to obtain second modulated sub-information. The network device may obtain the modulated information based on the first modulated sub-information and the second modulated sub-information. The network device then performs processing on the modulated information, to obtain the first signal. Specifically, the network device performs resource mapping and the second scrambling on the first modulated sub-information, to obtain a first sub-signal, and the network device performs resource mapping and the second scrambling on the second modulated sub-information, to obtain a second sub-signal. The network device may obtain the first signal based on the first sub-signal and the second sub-signal. The network device maps the first modulated sub-information to the second part of REs, and maps the second modulated sub-information to the first part of REs.

In another example, after generating original information, the network device adds a CRC to the original information, to obtain the first information. The network device performs processing on the first information, to obtain the encoded information. Specifically, the network device performs encoding on the first information, to obtain a first information sub-group, the network device extracts a part of information from the first information sub-group, where the extracted information is referred to as a second information sub-group. The network device obtains the encoded information based on the first information sub-group and the second information sub-group. The second information sub-group includes some or all bits of the first information sub-group, that is, the second information sub-group includes some or all bits obtained after encoding is performed on the first information.

The following describes, by using an example, a manner in which the network device obtains the second information sub-group.

The network device divides the first information sub-group into a plurality of fourth information sub-groups, and extracts some or all bits from each fourth information sub-group as one third information sub-group. All the extracted third information sub-groups form the second information sub-group, that is, the second information sub-group includes a plurality of third information sub-groups, the first information sub-group includes a plurality of fourth information sub-groups, and each third information sub-group is a subset of a fourth information sub-group.

To ensure compatibility with an earlier version, the network device may subsequently perform processing separately on the first information sub-group and the second information sub-group, to obtain the first scrambled information. To be specific, the network device performs the first scrambling on the first information sub-group, for example, the network device performs the first scrambling on the first information sub-group based on a first scramble code, to obtain first scrambled sub-information, and the network device performs the first scrambling on the second information sub-group based on a second scramble code, to obtain second scrambled sub-information. The network device may obtain the first scrambled information based on the first scrambled sub-information and the second scrambled sub-information. Scramble code initialization seeds of the first scramble code and the second scramble code may be same or different, but lengths of the two are different. That is, the first scramble code and the second scramble code are different scramble codes.

The network device performs processing on the first scrambled information, to obtain the modulated information. Specifically, the network device performs modulation on the first scrambled sub-information, to obtain first modulated sub-information, and the network device performs modulation on the second scrambled sub-information, to obtain second modulated sub-information. The network device obtains the modulated information based on the first modulated sub-information and the second modulated sub-information. The network device then performs processing on the modulated information, to obtain the first signal. Specifically, the network device performs resource mapping and the second scrambling on the first modulated sub-information, to obtain a first sub-signal, and the network device performs resource mapping and the second scrambling on the second modulated sub-information, to obtain a second sub-signal. Therefore, the network device may obtain the first signal based on the first sub-signal and the second sub-signal, and it may be understood that the first signal includes the first sub-signal and the second sub-signal. The network device maps the first modulated sub-information to the second part of REs, and maps the second modulated sub-information to the first part of REs.

Figure 4:
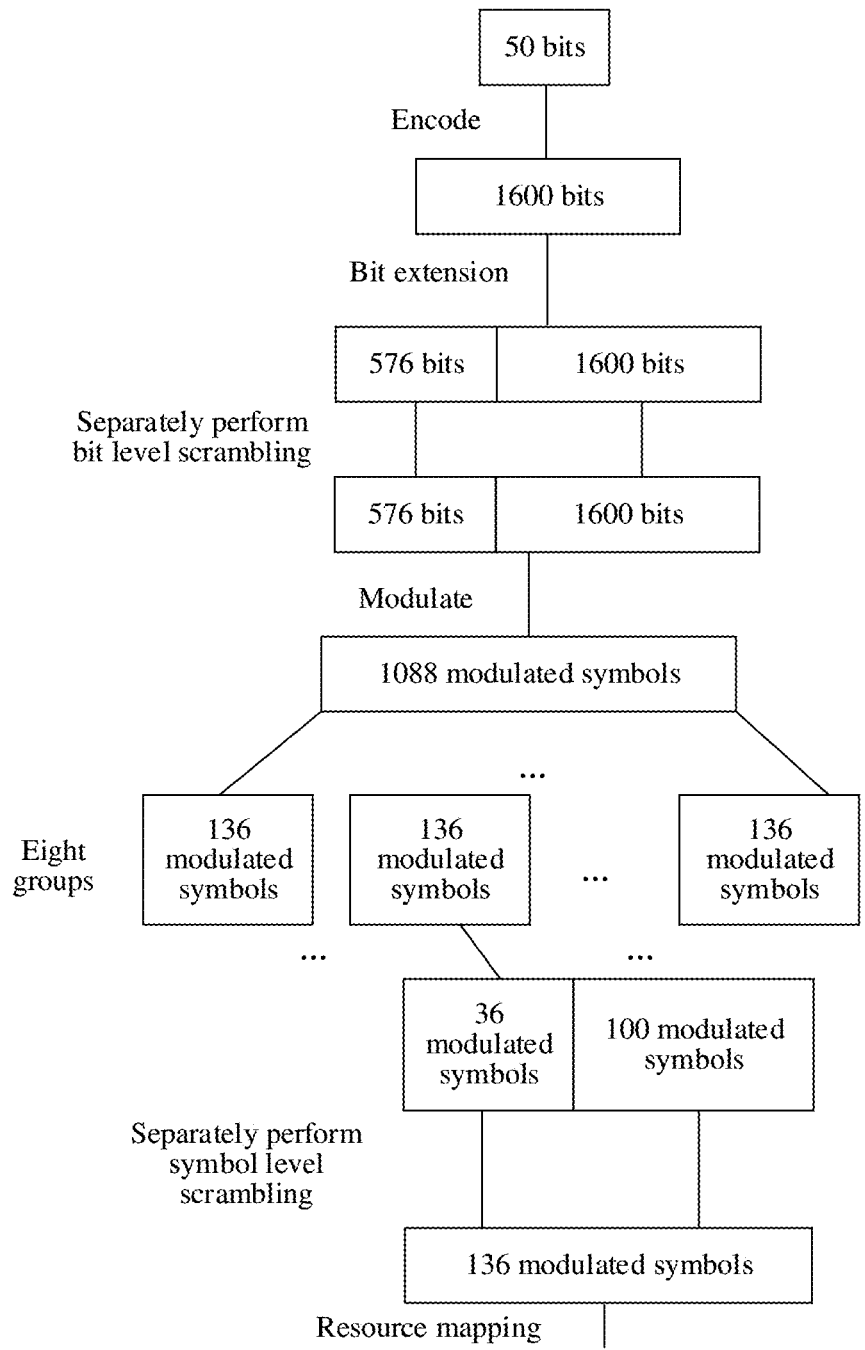
FIG. 4 is a schematic diagram of a process of processing an MIB-NB by a network device according to an embodiment of this application.

Referring to FIG. 4, a processing process of the network device is described by using the first signal carrying the MIB-NB as an example.

The network device adds a CRC to original information of the MIB-NB, to obtain the first information, and the first information includes 50 bits. The network device encodes the first information to 1600 bits, the 1600 bits are the first information sub-group, and the network device performs bit extension on the first information sub-group.

First, at least one bit in the 1600 bits included in the first information sub-group is added into the first information sub-group, or it may be understood that at least one bit is extracted from the 1600 bits included in the first information sub-group, and the extracted at least one bit forms the second information sub-group. The network device obtains the encoded information based on the 1600 bits and the extracted at least one bit, and the encoded information includes the first information sub-group and the second information sub-group. To simplify the description process, the first information sub-group is marked as A, and the second information sub-group is marked as A'. In FIG. 4, an example in which the A' includes 576 bits is used. For a method for extracting 576 bits from the 1600 bits by the network device, refer to FIG. 5. To be specific, the network device divides the first information sub-group of the 1600 bits into 8 groups, each group includes 200 bits, and each group is one fourth information sub-group. The fourth information sub-group is the $1^{st}$ bit to the $200^{th}$ bit in the first information sub-group, the $201^{st}$ bit to the $400^{th}$ bit in the first information sub-group, the $401^{st}$ bit to the $600^{th}$ bit in the first information sub-group, the $601^{st}$ bit to the $800^{th}$ bit in the first information sub-group, the $801^{st}$ bit to the $1000^{th}$ bit in the first information sub-group, the $1001^{st}$ bit to the $1200^{th}$ bit in the first information sub-group, the $1201^{st}$ bit to the $1400^{th}$ bit in the first information sub-group, or the $1401^{st}$ bit to the $1600^{th}$ bit in the first information sub-group.

Then, the network device extracts 72 bits from each fourth information sub-group, and every 72 bits are one third information sub-group. For example, the network device may extract last 72 bits of each fourth information sub-group, or may extract first 72 bits of each fourth information sub-group, or the network device may extract 72 bits at another location in the fourth information sub-group. The extracted 72 bits may be consecutive or may be non-consecutive. This is not limited in this embodiment of this application.

In a manner of grouping the first information sub-group and extracting bits from each group, the terminal device is enabled to obtain a signal combination gain from each group. In the NB-IoT system, after 1600 bits obtained after encoding is performed on original information of the MIB-NB are sequentially divided into 8 groups of 200 bits, the first group of 200 bits is transmitted in the first 80 ms of every 640 ms, the second group of 200 bits is transmitted in the second 80 ms of every 640 ms, and by analogy, the eighth group of 200 bits is transmitted in the eighth 80 ms of every 640 ms. Therefore, performing bit extraction by using a 200 bits-based grouping method enables an extracted signal to be close to an original signal corresponding thereto on a time domain, that is, in a same subframe. In this way, a receive end may combine the extracted signal with the original signal, to obtain a combination gain.

After obtaining A and A', the network device performs the first scrambling, namely, bit level scrambling, on the A, to obtain the first scrambled sub-information, and performs the first scrambling on A', to obtain the second scrambled sub-information. The network device obtains the first scrambled information based on the first scrambled sub-information and the second scrambled sub-information. The first scrambled sub-information is marked as B, and the second scrambled sub-information is marked as B'. The network device performs modulation on B, to obtain the first modulated sub-information, and performs modulation on B', to obtain the second modulated sub-information. The network device obtains the modulated information based on the first modulated sub-information and the second modulated sub-information. The network device, for example, performs quadrature phase shift keying (QPSK) modulation, to obtain the modulated information. In the example of FIG. 4, the modulated information includes 1088 modulated symbols. Certainly, the network device may use another modulation method such as a binary phase shift keying (BPSK) or 16 quadrature amplitude modulation (16 QAM). This is not limited in this embodiment of this application. Subsequently, the network device performs the second scrambling, namely, symbol level scrambling. In a process of performing symbol level scrambling, the first modulated sub-information and the second modulated sub-information are separately scrambled.

The process of symbol level scrambling is as follows. The network device sequentially divides the modulated information into eight groups, each group includes n modulated symbols, where n>100. In FIG. 4, n=136 is used as an example. The 136 modulated symbols include a modulated symbol obtained by performing modulation on B and a modulated symbol obtained by performing modulation on B', that is, includes a modulated symbol in the first modulated sub-information and a modulated symbol in the second modulated sub-information. In this embodiment of this application, the network device performs the second scrambling separately on the two parts of modulated symbols. Therefore, 36 modulated symbols in one group in FIG. 4 represent modulated symbols obtained by performing modulation on B', namely, modulated symbols in the second modulated sub-information, and 100 modulated symbols in one group represent modulated symbols obtained by performing modulation on B, namely, modulated symbols in the first modulated information. The network device maps n modulated symbols in the first group of the eight groups to a subframe 0 of a radio frame of which a frame number is 64k, and performs symbol level scrambling, maps n modulated symbols in the first group to a subframe 0 of a radio frame of which a frame number is 64k+1, and performs symbol level scrambling, . . . , and maps n modulated symbols in the first group to a subframe 0 of a radio frame of which a frame number is 64k+7, and performs symbol level scrambling, where k is an integer belonging to a range of [0, 127]. For n symbols in the second group of the eight groups, the foregoing operations are repeated, but the n symbols in the second group of the eight groups are separately mapped to subframes 0 of radio frames of which frame numbers are 64k+8, 64k+9, . . . , and 64k+15, and symbol level scrambling is separately performed. By analogy, for n symbols in the third group to the eighth group of the eight groups, the foregoing operations are also repeated. For example, the n symbols in the eighth group of the eight groups are separately mapped to subframes 0 radio frames of which frame numbers are 64k+56, 64k+57, . . . , and 64k+63, and symbol level scrambling is separately performed. In this way, the network device generates the first signal.

Figure 5:
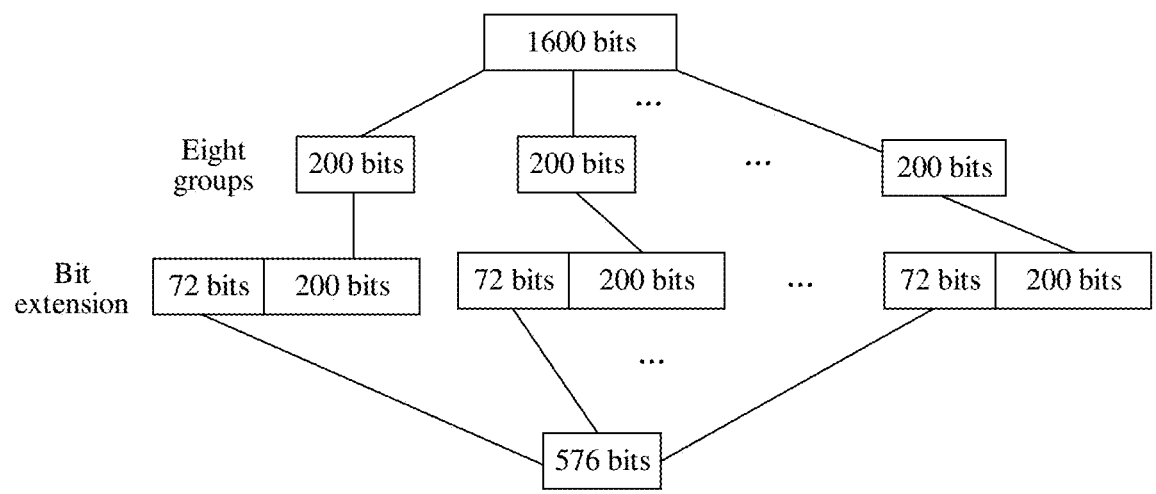
FIG. 5 is a schematic diagram of a method of selecting 576 bits from 1600 bits by a network device according to an embodiment of this application.

It should be noted that, in exemplifying processes in FIG. 4 and FIG. 5, extracting 576 bits from 1600 bits included in the first information sub-group is used as example. Using such a manner can ensure consistency of bit rates. Specifically, in an existing NPBCH, a quantity of available REs in one subframe is 100, and a quantity of bits carried by the 100 REs is 200. For example, if only REs corresponding to first three OFDM symbols on a subframe 0, a subframe 5, and a subframe 9 are used, and REs corresponding to a location of the CRS in the last 11 OFDM symbols are not used, then a quantity of the first part of REs is 3*12=36. Therefore, on the premise that the bit rates are consistent, the 36 REs need to carry 36/100*200=72 bits, that is, 72 bits are newly added to each subframe (or every 200 bits). There are eight groups of 200 bits in total, and 8*72=576 bits are newly added in total. However, a quantity of bits extracted from the first information sub-group is not limited in this embodiment of this application. That is, a quantity of bits included in the second information sub-group is not limited. For example, if the first part of REs includes all REs corresponding to the first three OFDM symbols and REs corresponding to the location of the CRS in the last 11 OFDM symbols, there are 36+16=52 REs in total, and on the premise that the bit rates are consistent, 52/100*200=104 bits may be newly added to each subframe (or every 200 bits), and 8*104=832 bits are newly added to the entire 1600 bits in total.

In another example, after generating original information, the network device adds a CRC to the original information, to obtain the first information. The network device performs encoding on the first information, to obtain the encoded information. The network device performs first processing on the encoded information, to obtain the first scrambled information. Specifically, the network device performs first scrambling on the encoded information, to obtain a first scrambled sub-information, the network device extracts a part of information from the first scrambled sub-information, and the extracted information is referred to as second scrambled sub-information. The network device then obtains the first scrambled information based on the first scrambled sub-information and the second scrambled sub-information. To ensure compatibility with an earlier version, the network device may subsequently perform processing separately on the first scrambled sub-information and the second scrambled sub-information, to obtain the modulated information. Specifically, the network device performs modulation on the first scrambled sub-information, to obtain first modulated sub-information, and the network device performs modulation on the second scrambled sub-information, to obtain second modulated sub-information. The network device obtains the modulated information based on the first modulated sub-information and the second modulated sub-information. The network device further performs processing on the modulated information, to obtain the first signal. Specifically, the network device performs resource mapping and the second scrambling on the first modulated sub-information, to obtain a first sub-signal, and the network device performs resource mapping and the second scrambling on the second modulated sub-information, to obtain a second sub-signal. Therefore, the network device may obtain the first signal based on the first sub-signal and the second sub-signal, and it may be understood that the first signal includes the first sub-signal and the second sub-signal. The network device maps the first modulated sub-information to the second part of REs, and maps the second modulated sub-information to the first part of REs.

In another example, after generating original information, the network device adds a CRC to the original information, to obtain the first information. The network device performs encoding on the first information, to obtain the encoded information. The network device performs the first scrambling on the encoded information, to obtain the first scrambled information. The network device performs processing on the first scrambled information, to obtain the modulated information. Specifically, the network device performs modulation on the first scrambled information, to obtain first modulated sub-information, and the network device extracts a part of information from the first modulated sub-information, where the extracted information is referred to as second modulated sub-information. The network device obtains the modulated information based on the first modulated sub-information and the second modulated sub-information. That is, the second modulated sub-information includes some or all modulated symbols in the first modulated sub-information, and to be specific, the second modulated sub-information includes some or all modulated symbols that are in the first modulated sub-information and that are obtained after modulation is performed on the first scrambled information. To ensure compatibility with an earlier version, the network device may subsequently perform processing separately on the first modulated sub-information and the second modulated sub-information, to obtain the first signal. To be specific, the network device performs resource mapping and the second scrambling on the first modulated sub-information, for example, the network device performs the second scrambling on the first modulated sub-information based on a third scramble code, to obtain a first sub-signal, and the network device performs resource mapping and the second scrambling on the second modulated sub-information, for example, the network device performs the second scrambling on the second modulated sub-information based on a fourth scramble code, to obtain a second signal. The network device obtains the first signal based on the first sub-signal and the second sub-signal. The network device maps the first modulated sub-information to the second part of REs, and maps the second modulated sub-information to the first part of REs. Scramble code initialization seeds of the third scramble code and the fourth scramble code may be same or different, but lengths of the two are different, that is, the third scramble code and the fourth scramble code are different scramble codes. In some implementations, the fourth scramble code may be a segment of information in the third scramble code, that is, the fourth scramble code may be regarded as a segment of the third scramble code.

After the network device performs modulation on the first scrambled information, there may be another processing manner. That is, the network device performs modulation on the first scrambled information, to directly obtain the modulated information, and the network device performs processing on the modulated information, to obtain the first signal. Specifically, the network device performs the second scrambling on the modulated information, to obtain third scrambled sub-information, and the network device extracts a part of information from the third scrambled sub-information, to obtain fourth scrambled sub-information, so that the fourth scrambled sub-information is a subset of the third scrambled sub-information. The network device may obtain the first signal based on the third scrambled sub-information and the fourth scrambled sub-information. Compared with the solution of making the fourth scramble code be a segment of the third scramble code in the previous example, the network device using such a processing manner can produce a same or similar effect.

Figure 6:
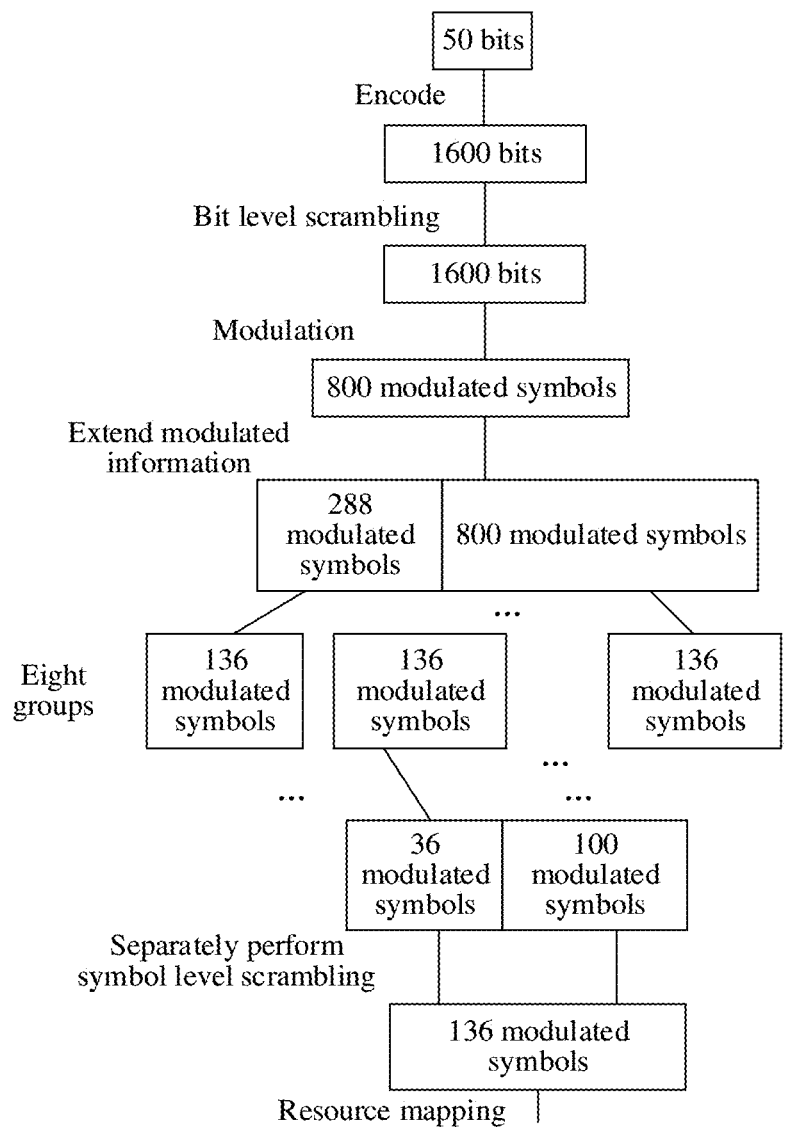
FIG. 6 is a schematic diagram of another process of processing an MIB-NB by a network device according to an embodiment of this application.

Referring to FIG. 6, a processing process of the network device is described by using the first signal carrying the MIB-NB as an example. The network device adds a CRC to original information of the MIB-NB, to obtain the first information, and the first information includes 50 bits. The network device encodes the first information to 1600 bits, and the 1600 bits are the encoded information. The network device performs the first scrambling, namely, bit level scrambling, on the encoded information, to obtain the first scrambled information. The network device performs modulation on the first scrambled information, to obtain the first modulated sub-information, and the network device performs extension on the first modulated sub-information and extracts all or some of modulated symbols that are in the first modulated sub-information and that are obtained after modulation is performed on the first scrambled information. The extracted modulated symbols form the second modulated sub-information, and the network device obtains the modulated information based on the first modulated sub-information and the second modulated sub-information. The network device, for example, performs QPSK modulation to obtain the modulated information. In the example of FIG. 6, the first modulated sub-information includes 800 modulated symbols. Certainly, the network device may use another modulation method such as 16 QAM. This is not limited in this embodiment of this application.

Figure 7:
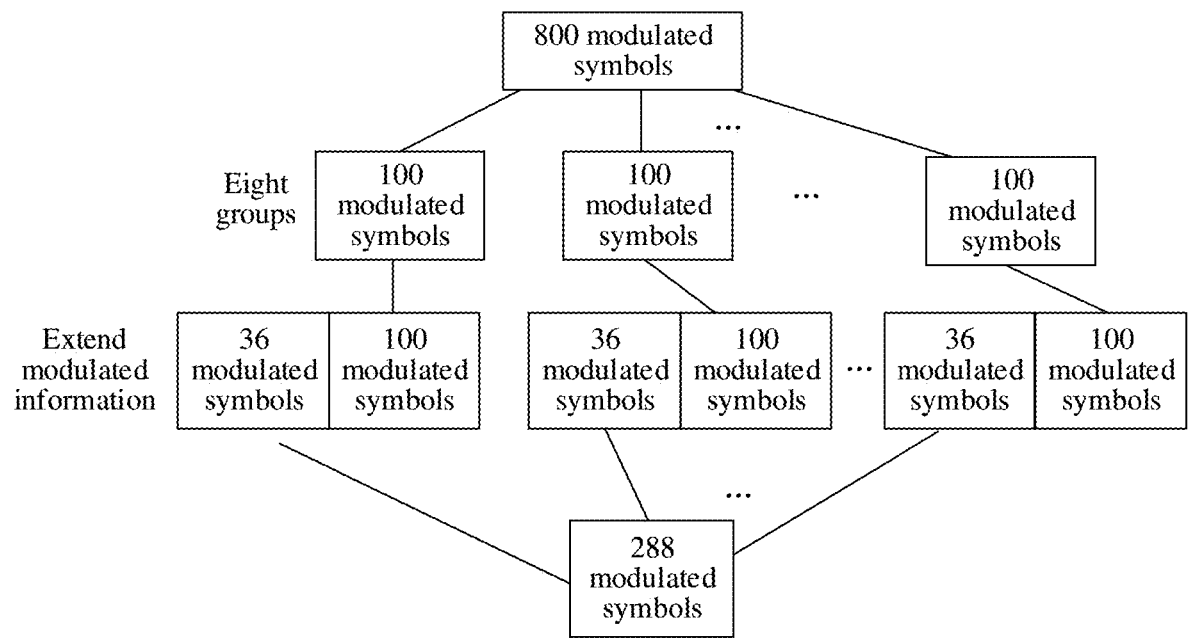
FIG. 7 is a schematic diagram of a method of selecting 288 modulated symbols from 800 modulated symbols by a network device according to an embodiment of this application.

A process of obtaining the second modulated sub-information by the network device is as follows. The network device performs extension on the first modulated sub-information, and specifically, adds at least one of the 800 modulated symbols included in the first modulated sub-information to the first modulated sub-information, where the extracted at least one modulated symbol forms the second modulated sub-information. The network device obtains the modulated information based on the 800 modulated symbols and the extracted at least one modulated symbol, and the modulated information includes the first modulated sub-information and the second modulated sub-information. In FIG. 6, an example in which the second modulated sub-information includes 288 modulated symbols is used. For a method of selecting 288 modulated symbols from the 800 modulated symbols by the network device, refer to FIG. 7. That is, the network device divides the first modulated sub-information including 800 modulated symbols into 8 groups, and each group includes 100 modulated symbols. The network device extracts 36 modulated symbols from each group. For example, the network device may extract last 36 modulated symbols of each group, or may extract first 36 modulated symbols of each group, or the network device may extract 36 modulated symbols at another location in each group. This is not limited in this embodiment of this application. In a manner of grouping the first modulated sub-information and extracting modulated symbols from each group, the terminal device is enabled to obtain a signal combination gain from each group. In the NB-IoT system, after the 1600 bits obtained after encoding is performed on the original information of the MIB-NB are sequentially divided into the 8 groups of 200 bits, the first group of 200 bits is transmitted in the first 80 ms of every 640 ms, the second group of 200 bits is transmitted in the second 80 ms of every 640 ms, and by analogy, the eighth group of 200 bits is transmitted in the eighth 80 ms of every 640 ms. Therefore, performing bit extraction by using a 200 bits-based grouping method enables an extracted signal to be close to an original signal corresponding thereto on a time domain, that is, in a same subframe. In this way, a receive end may combine the extracted signal with the original signal, to obtain a combination gain.

Subsequently, the network device performs resource mapping and the second scrambling on the modulated information. The second scrambling is symbol level scrambling. In a process of performing the symbol level scrambling, the first modulated sub-information and the second modulated sub-information are separately scrambled.

The process of the symbol level scrambling is as follows. The network device divides the modulated information into eight groups sequentially, each group includes n modulated symbols, where n>100. In FIG. 4, n=136 is used as an example. The 136 modulated symbols include a modulated symbol in the first modulated sub-information and a modulated symbol in the second modulated sub-information. In this embodiment of this application, the network device performs the second scrambling separately on the two parts of modulated symbols. Therefore, 36 modulated symbols in one group in FIG. 6 represent modulated symbols in the second modulated sub-information, and 100 modulated symbols in one group represent modulated symbols in the first modulated information. The network device maps n modulated symbols in the first group of the eight groups to a subframe 0 of a radio frame of which a frame number is 64k, and performs symbol level scrambling, maps n modulated symbols in the first group to a subframe 0 of a radio frame of which a frame number is 64k+1, and performs symbol level scrambling, . . . , and maps n modulated symbols in the first group to a subframe 0 of a radio frame of which a frame number is 64k+7, and performs symbol level scrambling, where k is an integer belonging to a range of [0, 127]. For n symbols in the second group of the eight groups, the foregoing operations are repeated, but the n symbols in the second group of the eight groups are separately mapped to subframes 0 of radio frames of which frame numbers are 64k+8, 64k+9, . . . , 64k+15, and symbol level scrambling is separately performed. By analogy, for n symbols in the third group to the eighth group of the eight groups, the foregoing operations are also repeated. For example, the n symbols in the eighth group of the eight groups are separately mapped to subframes 0 radio frames of which frame numbers are 64k+56, 64k+57, . . . , and 64k+63, and symbol level scrambling is separately performed. In this way, the network device generates the first signal.

It can be learned from the foregoing described examples that, that the network device needs to extract B information from A information by is mentioned throughout this embodiment of this application. For example, the network device extracts a part of information from the original information, or the network device extracts a part of information from the original information to which the CRC is added, or after performing encoding on the first information, the network device extracts a part of information from the obtained first information sub-group, or after performing the first scrambling on the encoded information, the network device extracts a part of information from the obtained first scrambled sub-information, or after performing modulation on the first scrambled information, the network device extracts a part of information from the obtained first modulated sub-information, or after performing the second scrambling on the modulated information, the network device extracts a part of information from the obtained third scrambled sub-information, and so on. In summary, regardless of what type of information the A information and the B information are, in this embodiment of this application, when the B information is extracted from the A information, any part of the A information may be extracted as the B information. For example, a beginning part of information of the A information is extracted as the B information, or an ending part of information of the A information is extracted as the B information, or a part of information at another location in the A information is extracted as the B information, and the extracted information may be consecutive or may be non-consecutive.

It should be noted that, in the foregoing examples, the "first information sub-group" that appears in different examples may represent same information or different information, the "second information sub-group" that appears in different examples may represent same information or different information, the "first scrambled sub-information" that appears in different examples may represent same information or different information, the "second scrambled sub-information" that appears in different examples may represent same information or different information, the "first modulated sub-information" that appears in different examples may represent same information or different information, the "second modulated sub-information" that appears in different examples may represent same information or different information, the "first sub-signal" that appears in different examples may represent same information or different information, and the "second sub-signal" that appears in different examples may represent same information or different information.

The network device may select and use one of the several described manners of generating the first signal based on an actual situation, or may select and use one of them as specified by a protocol. This is not limited in this embodiment of this application.

After generating the first signal, the network device may send the first signal by using the first part of REs and the second part of REs in the first resource, and the terminal device may receive the first signal by using the first part of REs and the second part of REs in the first resource. The following describes a processing process after the terminal device receives the first signal.

After receiving the first signal by using the first part of REs and the second part of REs, the terminal device parses the first signal to obtain the information carried by the first signal. For example, if the first signal carries the MIB-NB, the first signal can carry the entire MIB-NB and a part of the MIB-NB.

Specifically, the terminal device can perform first descrambling on the first signal, to obtain the modulated information, where the first descrambling is a reverse process of the foregoing second scrambling. Subsequently, the terminal device performs demodulation on the modulated information, to obtain the first scrambled information. The terminal device performs second descrambling on the first scrambled information, to obtain the encoded information, where the second descrambling is a reverse process of the foregoing first scrambling. The terminal device performs decoding on the encoded information, to obtain the information carried by the first signal. After decoding the encoded information, the terminal device can further remove the CRC from the obtained information to obtain the original information.

Several manners of generating the first signal by the network device are described above, and the terminal device uses corresponding manners of parsing the first signal with respect to different manners of generating the first signal. Descriptions are separately provided below.

In an example, if the network device extracts a part of original information from the original information after generating the original information, after receiving the first signal, the terminal device performs first descrambling on the first signal, to obtain the modulated information, and subsequently performs demodulation on the modulated information, to obtain the first scrambled information, and the terminal device performs second descrambling on the first scrambled information, to obtain the encoded information, and performs processing on the encoded information, to obtain the information carried by the first signal. Specifically, the terminal device performs decoding on the encoded information, to obtain decoded encoded information, and the terminal device removes the CRC from the decoded encoded information, to obtain the original information and the part of the original information, that is, the information carried by the first signal.

In another example, if the network device extracts a part of original information to which the CRC is added from original information to which the CRC is added, after receiving the first signal, the terminal device performs the first descrambling on the first signal, to obtain the modulated information, and subsequently performs demodulation on the modulated information, to obtain the first scrambled information, the terminal device performs the second descrambling on the first scrambled information, to obtain the encoded information, and the terminal device performs processing on the encoded information, to obtain the information carried by the first signal. Specifically, the terminal device performs decoding on the encoded information, to obtain decoded encoded information, where the decoded encoded information includes the original information to which the CRC is added and the part of the original information to which the CRC is added. The terminal device removes the CRC from the original information to which the CRC is added and the part of the original information to which the CRC is added, to obtain the original information and the part of the original information, that is, the information carried by the first signal.

In another example, if the network device extracts a part of encoded first information from the encoded first information, that is, the encoded information includes a first information sub-group and a second information sub-group, after receiving the first signal, the terminal device performs the first descrambling on the first signal, to obtain the modulated information, subsequently, the terminal device performs demodulation on the modulated information, to obtain the first scrambled information, and the terminal device performs the second descrambling on the first scrambled information, to obtain the first information sub-group and the second information sub-group. The terminal device then performs processing on the first information sub-group and the second information sub-group, to obtain the information carried by the first signal. Specifically, the terminal device performs decoding on the first information sub-group, to obtain a decoded first information group, and the terminal device performs decoding on the second information sub-group, to obtain a decoded second information sub-group, where the second information sub-group includes some or all bits that are extracted from the first information sub-group and that are obtained after encoding is performed on the first information used to generate the first signal. The terminal device obtains the information carried by the first signal based on the decoded first information sub-group and the decoded second information sub-group. Specifically, the terminal device may remove the CRC from the decoded first information sub-group and the decoded second information sub-group, to obtain the information carried by the first signal.

In another example, if the network device extracts a part of the encoded information on which the first scrambling has performed from the encoded information on which the first scrambling has performed, after receiving the first signal, the terminal device performs the first descrambling on the first signal, to obtain the modulated information, and subsequently, the terminal device performs demodulation on the modulated information, to obtain the first scrambled information. The first scrambled information includes the encoded information on which the first scrambling has performed and the part of the encoded information on which the first scrambling has performed. The terminal device performs the second descrambling separately on the encoded information on which the first scrambling has performed and the part of the encoded information on which the first scrambling has performed, to obtain the encoded information. The terminal device performs decoding on the encoded information, to obtain the decoded encoded information. The terminal device removes the CRC from the decoded encoded information, to obtain the information carried by the first signal.

In another example, if the network device extracts a part of modulated first scrambled information from the modulated first scrambled information, that is, the modulated information includes first modulated sub-information and second modulated sub-information, after receiving the first signal, the terminal device performs the first descrambling on the first signal, to obtain the first modulated sub-information and the second modulated sub-information, subsequently, the terminal device performs demodulation on the first modulated sub-information, to obtain demodulated first modulated sub-information, and the terminal device performs demodulation on the second modulated sub-information, to obtain demodulated second modulated sub-information. The second modulated sub-information includes some or all modulated symbols that are extracted from the first modulated sub-information and that are obtained after modulation is performed on the first scrambled information. The terminal device obtains the first scrambled information based on the demodulated first modulated sub-information and the demodulated second modulated sub-information, and the terminal device performs the second descrambling on the first scrambled information, to obtain the encoded information. The terminal device performs decoding on the encoded information, to obtain the decoded encoded information. The terminal device removes the CRC from the decoded encoded information, to obtain the information carried by the first signal.

In another example, if the network device extracts a part of the modulated information on which the second scrambling has been performed from the modulated information on which the second scrambling has been performed, after receiving the first signal, the terminal device performs the first descrambling separately on the modulated information on which the second scrambling has been performed and the part of the modulated information on which the second scrambling has been performed, and obtains the modulated information, and subsequently, the terminal device performs demodulation on the modulated information, to obtain the first scrambled information. The terminal device performs second descrambling on the first scrambled information, to obtain encoded information. The terminal device performs decoding on the encoded information, to obtain the decoded encoded information. The terminal device removes the CRC from the decoded encoded information, to obtain the information carried by the first signal.

Specifically, the terminal device may select a manner of parsing the first signal from the foregoing described manners based on a manner of generating the first signal by the network device. In this way, the terminal device completes parsing on the first signal, to obtain the information carried by the first signal. The network device sends the first signal by using resources that are originally not used, so that more information is carried by the first signal, and the terminal device can obtain more information through the first signal, thereby reducing an information obtaining latency of the terminal device and improving performance of performing demodulation on the first signal by the terminal device.

The following describes a device provided in the embodiments of this application with reference to the accompanying drawings.

Figure 8:
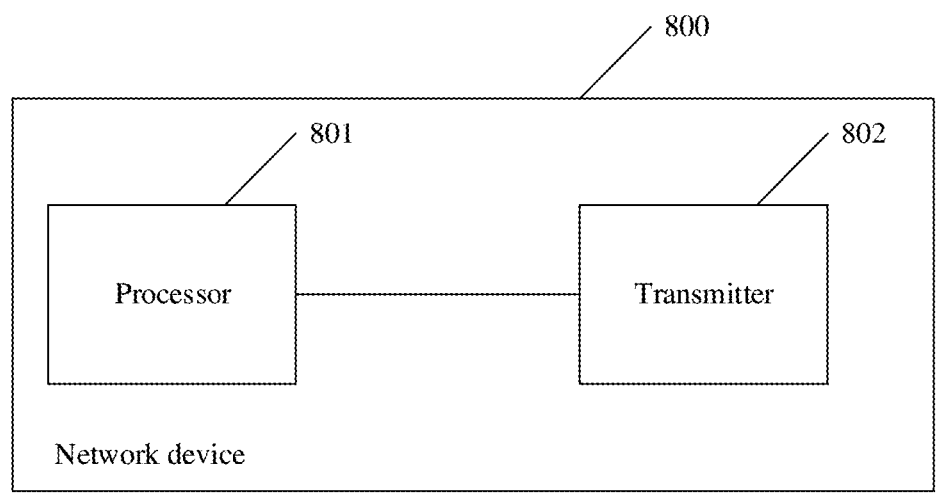
FIG. 8 is a schematic structural diagram of a network device according to an embodiment of this application.

FIG. 8 is a schematic structural diagram of a network device 800. The network device 800 may implement functions of the terminal device included in the foregoing. The network device 800 may include a processor 801 and a transmitter 802. The processor 801 may be configured to perform S31 in the embodiment shown in FIG. 3, and/or configured to support another process of the technology described in this specification. The transmitter 802 may be configured to perform S32 in the embodiment shown in FIG. 3, and/or configured to support another process of the technology described in this specification.

For example, the processor 801 is configured to generate the first signal, and the transmitter 802 is used to send the first signal on the first resource. The first resource includes a first part of REs, and the first part of REs includes at least one of all REs corresponding to an orthogonal frequency division multiplexing OFDM symbol 0, an OFDM symbol 1, and an OFDM symbol 2 in each of a subframe 0, a subframe 5, and a subframe 9 of each radio frame on a first carrier, or an RE2, an RE5, an RE8, and an RE11 in each of an OFDM symbol 4, an OFDM symbol 7, an OFDM symbol 8, and an OFDM symbol 11 in each of the subframe 0, the subframe 5, and the subframe 9 of each radio frame on the first carrier.

The first carrier includes an anchor carrier in an NB-IoT or a non-anchor carrier in the NB-IoT.

For the descriptions of functions of the corresponding functional modules, refer to all related contents of the steps in the foregoing method embodiments. Details are not described herein again.

Figure 9:
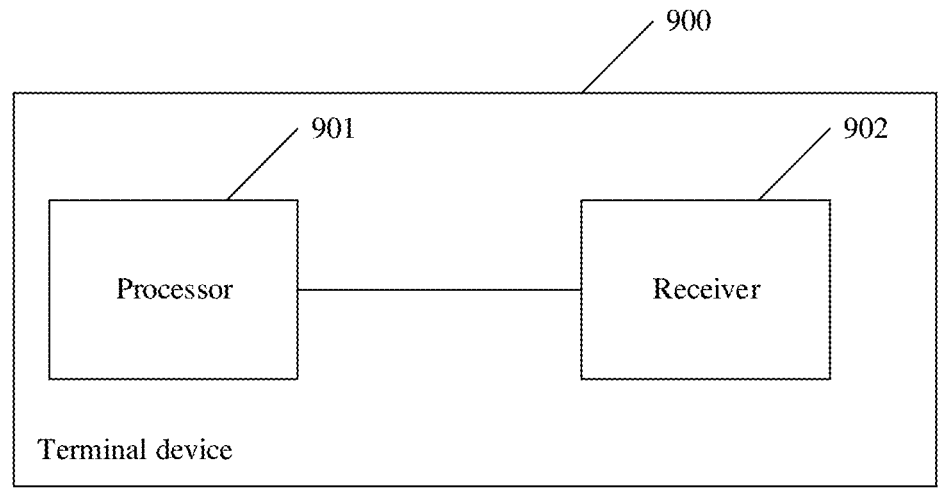
FIG. 9 is a schematic structural diagram of a terminal device according to an embodiment of this application.

FIG. 9 is a schematic structural diagram of a terminal device 900. The terminal device 900 may implement functions of the terminal device included in the foregoing. The terminal device 900 may include a processor 901 and a receiver 902. The processor 901 may be configured to perform S33 in the embodiment shown in FIG. 3, and/or configured to support another process of the technology described in this specification. The receiver 902 may be configured to perform S32 in the embodiment shown in FIG. 3, and/or configured to support another process of the technology described in this specification.

For example, the receiver 902 is configured to receive, by using the first resource, the first signal sent by the network device, and the processor 901 is configured to parse the first signal, to obtain the information carried by the first signal. The first resource includes the first part of REs, and the first part of REs includes at least one of all REs corresponding to an orthogonal frequency division multiplexing OFDM symbol 0, an OFDM symbol 1, and an OFDM symbol 2 in each of a subframe 0, a subframe 5, and a subframe 9 of each radio frame on the first carrier, or an RE2, an RE5, an RE8, and an RE11 in each of an OFDM symbol 4, an OFDM symbol 7, an OFDM symbol 8, and an OFDM symbol 11 in each of the subframe 0, the subframe 5, and the subframe 9 of each radio frame on the first carrier.

The first carrier includes an anchor carrier in an NB-IoT or a non-anchor carrier in the NB-IoT.

For the descriptions of functions of the corresponding functional modules, refer to all related contents of the steps in the foregoing method embodiments. Details are not described herein again.

In the embodiments of this application, the network device 800 and the terminal device 900 are presented in a form of dividing the functional modules corresponding to the functions, or may be presented in a form of integrating the functional modules. The "module" herein may be an application-specific integrated circuit (application-specific integrated circuit, ASIC), a processor, and a memory for executing one or more software or firmware programs, an integrated logic circuit, and/or another component that can provide the foregoing function.

Figure 10:
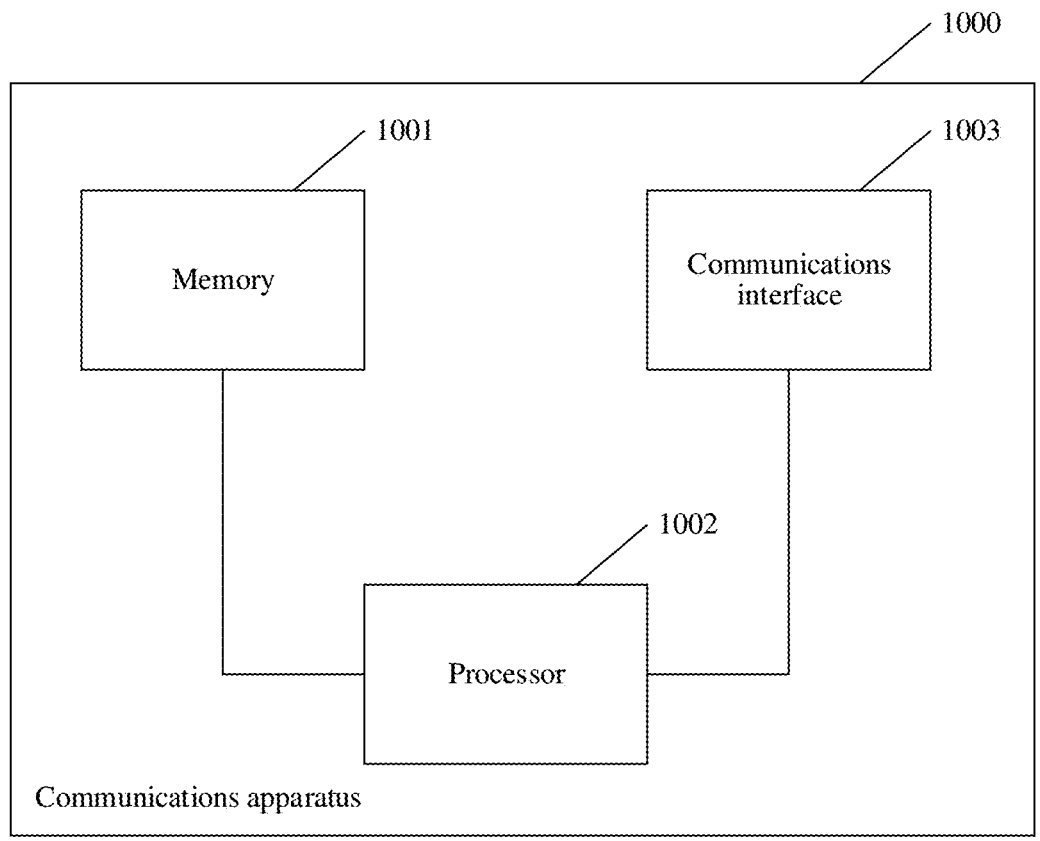
FIG. 10 is a schematic structural diagram of a communications apparatus according to an embodiment of this application.
Figure 11:
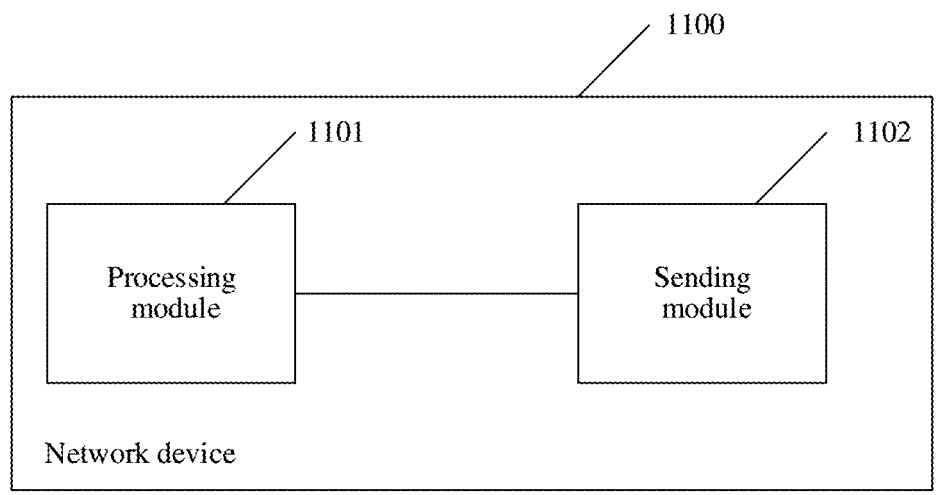
FIG. 11 is a schematic structural diagram of a network device according to an embodiment of this application.
Figure 12:
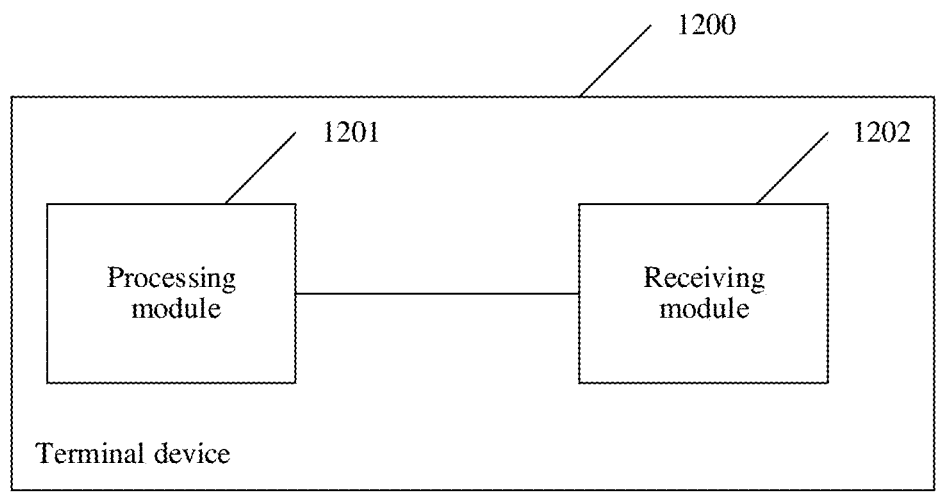
FIG. 12 is a schematic structural diagram of a terminal device according to an embodiment of this application.

In a simple embodiment, a person skilled in the art may figure out that, the network device 800 or the terminal device 900 may alternatively be implemented by using a structure of a communications apparatus 1000 shown in FIG. 10.

As shown in FIG. 10, the communications apparatus 1000 may include a memory 1001, a processor 1002, and a communications interface 1003. The memory 1001 and the communications interface 1003 are connected to the processor 1002. The memory 1001 is configured to store a computer-executable instruction. When the communications apparatus 1000 is run, the processor 1002 executes the computer-executable instruction stored in the memory 1001, so that the communications apparatus 1000 performs the method provided in the embodiment shown in FIG. 3. For the specific method, refer to related descriptions in the foregoing and the accompanying drawings. Details are not described herein again. The communications interface 1003 may be implemented by a transceiver, or may be implemented by an independent receiver and an independent transmitter.

In an example, the transmitter 802 may correspond the communications interface 1003 in FIG. 10. The processor 801 may be embedded in or independent of the memory 1001 of the communications apparatus 1000 in a hardware form/software form.

In an example, the receiver 902 may correspond the communications interface 1003 in FIG. 10. The processor 901 may be embedded in or independent of the memory 1001 of the communications apparatus 1000 in a hardware form/software form.

Optionally, the communications apparatus 1000 may be a field-programmable gate array (FPGA), an application specific integrated circuit (ASIC), a system on chip (SoC), or a central processor unit (CPU), a network processor (NP), a digital signal processor (DSP), or a micro controller unit (MCU), or a programmable logic device (PLD) or another integrated chip may be used. Alternatively, the communications apparatus 1000 may be an independent network element, such as the foregoing terminal device or network device.

In addition, the network device provided in the embodiment shown in FIG. 3 may alternatively be implemented in another form. For example, the network device 1100 includes a processing module 1101 and a sending module 1102. The processing module 1101 may be configured to perform S31 in the embodiment shown in FIG. 3, and/or configured to support another process of the technology described in this specification. The sending module 1102 may be configured to perform S32 in the embodiment shown in FIG. 3, and/or configured to support another process of the technology described in this specification.

For example, the processing module 1101 is configured to generate the first signal, and the sending module 1102 is used to send the first signal on the first resource. The first resource includes the first part of REs, and the first part of REs includes at least one of all REs corresponding to an orthogonal frequency division multiplexing OFDM symbol 0, an OFDM symbol 1, and an OFDM symbol 2 in each of a subframe 0, a subframe 5, and a subframe 9 of each radio frame on the first carrier, or an RE2, an RE5, an RE8, and an RE11 in each of an OFDM symbol 4, an OFDM symbol 7, an OFDM symbol 8, and an OFDM symbol 11 in each of the subframe 0, the subframe 5, and the subframe 9 of each radio frame on the first carrier.

The first carrier includes an anchor carrier in an NB-IoT or a non-anchor carrier in the NB-IoT.

For the descriptions of functions of the corresponding functional modules, refer to all related contents of the steps in the foregoing method embodiments. Details are not described herein again.

In addition, the terminal device provided in the embodiment shown in FIG. 3 may alternatively be implemented in another form. For example, the terminal device 1200 includes a processing module 1201 and a receiving module 1202. The processing module 1201 may be configured to perform S33 in the embodiment shown in FIG. 3, and/or configured to support another process of the technology described in this specification. The receiving module 1202 may be configured to perform S32 in the embodiment shown in FIG. 3, and/or configured to support another process of the technology described in this specification.

For example, the receiving module 1202 is configured to receive, by using the first resource, the first signal sent by the network device, and the processing module 1201 is configured to parse the first signal and obtain the information carried by the first signal. The first resource includes the first part of REs, and the first part of REs includes at least one of all REs corresponding to an orthogonal frequency division multiplexing OFDM symbol 0, an OFDM symbol 1, and an OFDM symbol 2 in each of a subframe 0, a subframe 5, and a subframe 9 of each radio frame on the first carrier, or an RE2, an RE5, an RE8, and an RE11 in each of an OFDM symbol 4, an OFDM symbol 7, an OFDM symbol 8, and an OFDM symbol 11 in each of the subframe 0, the subframe 5, and the subframe 9 of each radio frame on the first carrier.

The first carrier includes an anchor carrier in an NB-IoT or a non-anchor carrier in the NB-IoT.

For the descriptions of functions of the corresponding functional modules, refer to all related contents of the steps in the foregoing method embodiments. Details are not described herein again.

The network device 800, the terminal device 900, the communications apparatus 1000, the network device 1100, and the terminal device 1200 provided the embodiments of this application may be configured to perform the method provided in the embodiment shown in FIG. 3. Therefore, for a technical effect that can be obtained, refer to the foregoing embodiment. Details are not described herein.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of this application may implement or operate the described functions by using a general-purpose processor a digital signal processor an ASIC, an FPGA or another programmable logical apparatus, a discrete gate or transistor logic, a discrete hardware component, or a design of any combination thereof. The general processor may be a microprocessor. Optionally, the general processor may also be any traditional processor controller, microcontroller, or state machine. The processor may also be implemented by a combination of computing apparatuses, such as a digital signal processor and a microprocessor multiple microprocessors, one or more microprocessors with a digital signal processor core, or any other similar configuration.

Steps of the methods or algorithms described in the embodiments of this application may be directly embedded into hardware, a software unit executed by a processor or a combination thereof. The software unit may be stored in a non-transitory computer readable storage medium, including, but not limited to a random access memory (RAM), a flash memory, a read only memory (ROM) memory, an electrically programmable read only memory (EPROM), an electrically erasable programmable read only memory (EEPROM), a register, a hard disk, solid state disk (SSD), a removable magnetic disk, a compact disc read only memory (CD-ROM), or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly, for related parts, refer to partial descriptions in the method embodiment.

According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. An information sending method, comprising:
generating, by a network device, a first signal; and
sending, on a first resource by the network device, the first signal to a terminal device, wherein the first resource comprises a first part of resource elements (REs), and the first part of the REs comprises at least one of a first RE element or a second RE element;

wherein the first RE element comprises all REs corresponding to an orthogonal frequency division multiplexing (OFDM) symbol 0, an OFDM symbol 1, and an OFDM symbol 2 in each of a subframe 0, a subframe 5, and a subframe 9 of each radio frame on a first carrier;

wherein the second RE element comprises an RE0, an RE3, an RE6, and an RE9 in each of an OFDM symbol 4, an OFDM symbol 7, an OFDM symbol 8, and an OFDM symbol 11 in the subframe 0 of each radio frame on the first carrier; and wherein the first carrier comprises an anchor carrier in a narrow band internet of things (NB-IoT) system or a non-anchor carrier in the NB-IoT system.

2. The method according to claim 1, wherein the first signal carries at least one of a master information block (MIB), a system information block (SIB), a synchronization signal, or a narrow band reference signal (NRS).

3. The method according to claim 1, wherein the generating, by a network device, the first signal comprises:
  obtaining encoded information by the network device by performing encoding on first information used to generate the first signal;
  obtaining first scrambled information by the network device by performing first scrambling on the encoded information;
  obtaining modulated information by the network device by performing modulation on the first scrambled information; and
  obtaining the first signal by the network device by performing second scrambling on the modulated information.

4. The method according to claim 3, wherein the obtaining the encoded information, comprises:
  obtaining a first information sub-group by the network device by performing encoding on the first information; and
  obtaining, by the network device, the encoded information according to the first information sub-group and a second information sub-group, wherein the second information sub-group comprises one or more bits that are in the first information sub-group and that are obtained after encoding is performed on the first information.

5. The method according to claim 4, wherein the second information sub-group comprises a plurality of third information sub-groups, wherein the first information sub-group comprises a plurality of fourth information sub-groups, and wherein each third information sub-group is a subset of one fourth information sub-group of the plurality of fourth information sub-groups; and
  wherein the fourth information sub-group comprises 200 bits that are, in the first information sub-group, one of a $1^{st}$ bit to a $200^{th}$ bit, a $201^{st}$ bit to a $400^{th}$ bit, a $401^{st}$ bit to a $600^{th}$ bit, a $601^{st}$ bit to an $800^{th}$ bit, an $801^{st}$ bit to a $1000^{th}$ bit, a $1001^{st}$ bit to a $1200^{th}$ bit, a $1201^{st}$ bit to a $1400^{th}$ bit, or a $1401^{st}$ bit to a $1600^{th}$ bit.

6. The method according to claim 4, wherein the obtaining the first scrambled information comprises:
  performing, by the network device, the first scrambling on the first information sub-group according to a first scramble code; and
  obtaining the first scrambled information by performing the first scrambling on the second information sub-group according to a second scramble code.

7. The method according to claim 3, wherein the obtaining the modulated information comprises:
  obtain first modulated sub-information by the network device by performing modulation on the first scrambled information; and
  obtaining, by the network device, the modulated information according to the first modulated sub-information and second modulated sub-information, wherein the second modulated sub-information comprises one or more modulated symbols that are in the first modulated sub-information and that are obtained after modulation is performed on the first scrambled information.

8. The method according to claim 7, wherein the obtaining the first signal comprises:
  performing, by the network device, the second scrambling on the first modulated sub-information according to a third scramble code; and
  obtaining the first signal by performing the second scrambling on the second modulated sub-information according to a fourth scramble code.

9. An information receiving method, comprising:
  receiving, by a terminal device by using a first resource, a first signal sent by a network device; and
  obtaining, by the terminal device, information carried by the first signal by parsing the first signal;
  wherein the first resource comprises a first part of resource elements REs, and the first part of REs comprises at least one of a first RE element or a second RE element:
  wherein the first RE element comprises all REs corresponding to an orthogonal frequency division multiplexing (OFDM) symbol 0, an OFDM symbol 1, and an OFDM symbol 2 in each of a subframe 0, a subframe 5, and a subframe 9 of each radio frame on a first carrier; or
  wherein the second RE element comprises an RE0, an RE3, an RE6, and an RE9 in each of an OFDM symbol 4, an OFDM symbol 7, an OFDM symbol 8, and an OFDM symbol 11 in the subframe 0 of each radio frame on the first carrier; and
  wherein the first carrier comprises an anchor carrier in a narrow band internet of things (NB-IoT) system or a non-anchor carrier in the NB-IoT system.

10. The method according to claim 9, wherein the first signal carries at least one of a master information block (MIB), a system information block (SIB), a synchronization signal, or a narrow band reference signal (NRS).

11. The method according to claim 9, wherein the obtaining the information by parsing the first signal, comprises:
  obtaining modulated information by the terminal device by performing first descrambling on the first signal;
  obtaining first scrambled information by the terminal device, by performing demodulation on the modulated information;
  obtaining encoded information by the terminal device by performing second descrambling on the first scrambled information; and
  obtain the information carried by the first signal by the terminal device by performing decoding on the encoded information.

12. The method according to claim 11, wherein the obtaining the first scrambled information comprises:
  obtaining demodulated first modulated sub-information by the terminal device by performing demodulation on first modulated sub-information of the modulated information;
  obtaining demodulated second modulated sub-information by the terminal device by performing demodulation on second modulated sub-information of the modulated information, wherein the second modulated sub-information comprises one or more modulated symbols that are extracted from the first modulated sub-information and that are obtained after modulation is performed on the first scrambled information; and obtaining, by the terminal device, the first scrambled information according to the demodulated first modulated sub-information and the demodulated second modulated sub-information.

13. The method according to claim 11, wherein the obtaining the information carried by the first signal comprises:

obtaining a decoded first information sub-group by the terminal device by performing decoding on a first information sub-group of the encoded information;

obtaining a decoded second information sub-group by the terminal device by performing decoding on a second information sub-group of the encoded information, wherein the second information sub-group comprises one or more bits that are extracted from the first information sub-group and that are obtained after encoding is performed on the first information used to generate the first signal; and obtaining, by the terminal device, according to the decoded first information sub-group and the decoded second information sub-group, information carried by the first signal.

14. The method according to claim 13, wherein the second information sub-group comprises a plurality of third information sub-groups, wherein the first information sub-group comprises a plurality of fourth information sub-groups, and wherein each third information sub-group is a subset of one fourth information sub-group of the plurality of fourth information sub-groups; and wherein the fourth information sub-group comprises 200 bits that are, in the first information sub-group, one of a $1^{st}$ bit to a $200^{th}$ bit, a $201^{st}$ bit to a $400^{th}$ bit, a $401^{st}$ bit to a $600^{th}$ bit, a $601^{st}$ bit to a $800^{th}$ bit, a $801^{th}$ bit to a $1000^{th}$ bit, a $1001^{st}$ bit to a $1200^{th}$ bit, a $1201^{st}$ bit to a $1400^{th}$ bit, or a $1401^{st}$ bit to a $1600^{th}$ bit.

15. A terminal device, comprising:
a receiver;
a processor; and
a non-transitory computer-readable storage medium storing a program to be executed by the processor, the program including instructions to:
receive, through the receiver, and by using a first resource, a first signal sent by a network device; and
obtain information carried by the first signal by parsing the first signal;
wherein the first resource comprises a first part of resource elements (REs), and wherein the first part of the REs comprises at least one of a first RE element or a second RE element;
wherein the first element comprises all REs corresponding to an orthogonal frequency division multiplexing (OFDM) symbol 0, an OFDM symbol 1, and an OFDM symbol 2 in each of a subframe 0, a subframe 5, and a subframe 9 of each radio frame on a first carrier;
wherein the second RE element comprises an RE0, an RE3, an RE6, and an RE9 in each of an OFDM symbol 4, an OFDM symbol 7, an OFDM symbol 8, and an OFDM symbol 11 in the subframe 0 of each radio frame on the first carrier; and wherein the first carrier comprises an anchor carrier in a narrow band internet of things NB-IoT or a non-anchor carrier in the NB-IoT.

16. The terminal device according to claim 15, wherein the first signal carries at least one of a master information block (MIB), a system information block (SIB), a synchronization signal, or an (NRS).

17. The terminal device according to claim 15, wherein instructions to obtain the information carried by the first signal by parsing the first signal include instructions to:
obtain modulated information by performing first descrambling on the first signal, to;
obtain first scrambled information by performing demodulation on the modulated information;
obtain encoded information by performing second descrambling on the first scrambled information; and
obtain the information carried by the first signal by performing decoding on the encoded information.

18. The terminal device according to claim 17, wherein the instructions to obtain the first scrambled information include instructions to:
obtain demodulated first modulated sub-information by performing demodulation on first modulated sub-information comprised in the modulated information;
obtain demodulated second modulated sub-information by performing demodulation on second modulated sub-information comprised in the modulated information, wherein the second modulated sub-information comprises one or more modulated symbols that are extracted from the first modulated sub-information and that are obtained after modulation is performed on the first scrambled information; and
obtain the first scrambled information according to the demodulated first modulated sub-information and the demodulated second modulated sub-information.

19. The terminal device according to claim 17, wherein the instructions to obtain the information carried by the first signal include instructions to:
obtain a decoded first information sub-group by performing decoding on a first information sub-group of the encoded information;
obtain a decoded second information sub-group by performing decoding on a second information sub-group of the encoded information, wherein the second information sub-group comprises one or more bits that are extracted from the first information sub-group and that are obtained after encoding is performed on the first information used to generate the first signal; and
obtain, according to the decoded first information sub-group and the decoded second information sub-group, the information carried by the first signal.

20. The terminal device according to claim 19, wherein the second information sub-group comprises a plurality of third information sub-groups, wherein the first information sub-group comprises a plurality of fourth information groups, and wherein each third information sub-group is a subset of one fourth information sub-group of the plurality of the fourth information groups; and wherein the fourth information sub-group comprises 200 bits that are, in the first information sub-group, one of a $1^{st}$ bit to a $200^{th}$ bit, a $201^{st}$ bit to a $400^{th}$ bit, a $401^{st}$ bit to a $600^{th}$ bit, a $601^{st}$ bit to a $800^{th}$ bit, a $801^{st}$ bit to a $1000^{th}$ bit, a $1001^{th}$ bit to a $1200^{th}$ bit, a $1201^{st}$ bit to a $1400^{th}$ bit, or a $1401^{st}$ bit to a $1600^{th}$ bit.

* * * * *

UNITED STATES PATENT AND TRADEMARK OFFICE
CERTIFICATE OF CORRECTION

PATENT NO. : 11,050,538 B2  
APPLICATION NO. : 16/739451  
DATED : June 29, 2021  
INVENTOR(S) : Tong Ji et al.

Page 1 of 1

It is certified that error appears in the above-identified patent and that said Letters Patent is hereby corrected as shown below:

In the Claims

In Claim 14, Column 31; Line 39 delete "$801^{th}$" insert --$801^{st}$--

In Claim 20, Column 32; Line 62 delete "$1001^{th}$" insert --$1001^{st}$--

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*